US009959256B1

(12) United States Patent
Alagappan

(10) Patent No.: US 9,959,256 B1
(45) Date of Patent: May 1, 2018

(54) WEB ASSET MODIFICATION BASED ON A USER CONTEXT

(71) Applicant: Trilibis, Inc., San Mateo, CA (US)

(72) Inventor: Meyyappan Alagappan, Sunnyvale, CA (US)

(73) Assignee: Trilibis, Inc., Sunnyvale, CA (US)

( * ) Notice: Subject to any disclaimer, the term of this patent is extended or adjusted under 35 U.S.C. 154(b) by 54 days.

(21) Appl. No.: 14/273,257

(22) Filed: May 8, 2014

(51) Int. Cl.
*G06F 17/21* (2006.01)
*G06F 17/22* (2006.01)

(52) U.S. Cl.
CPC ........ *G06F 17/2247* (2013.01); *G06F 17/212* (2013.01)

(58) Field of Classification Search
CPC ........ G06F 17/30867; G06F 17/30528; G06Q 30/02; G06Q 30/0244; G06Q 30/0251
See application file for complete search history.

(56) References Cited

U.S. PATENT DOCUMENTS 7,877,460 B1 * 1/2011 Brouwer ................ G06Q 10/10 709/205
8,578,426 B2 * 11/2013 Tiongson ......... H04N 21/25891 348/563
2003/0069881 A1 * 4/2003 Huttunen .......... G06F 17/30896
2003/0233614 A1 * 12/2003 Mohamed ............... G06F 17/24 715/255
2008/0005679 A1 * 1/2008 Rimas-Ribikauskas ...... G01C 21/3688 715/745
2008/0109306 A1 * 5/2008 Maigret .................. G06F 21/10 705/14.46
2009/0160883 A1 * 6/2009 Sonobe .................... G09G 5/00 345/699
2009/0204677 A1 * 8/2009 Michaelis ......... G06F 17/30867 709/206
2010/0138437 A1 * 6/2010 Nadig ................. G06F 17/3089 707/759
2010/0223341 A1 * 9/2010 Manolescu ....... G06F 17/30867 709/206
2011/0167077 A1 * 7/2011 Govani ............... G06F 17/3087 707/767
2011/0282700 A1 * 11/2011 Cockcroft .............. G06Q 10/02 705/5
2012/0023453 A1 * 1/2012 Wagner ............... G06F 3/04886 715/848
2012/0236201 A1 * 9/2012 Larsen ................... G06Q 10/10 348/468

(Continued)

OTHER PUBLICATIONS

Stackoverflow.com as available Nov. 18, 2012, pp. 1-3 http://stackoverflow.com/questions/8733073/check-if-ios-version-4-2-and-revise-css-based-on-result.*

*Primary Examiner* — Scott Baderman
*Assistant Examiner* — Mario M Velez-Lopez
(74) *Attorney, Agent, or Firm* — Van Pelt, Yi & James LLP

(57) ABSTRACT

A system for web asset modification comprises a processor and a memory. The processor is configured to: receive a request for a web asset for display on a device; receive an indication of one or more user contexts; determine one or more groups for the web asset, wherein each of the one or more groups comprises a group for adapting display of the web asset on the device; and modify the web asset based at least in part on one user context of the one or more user contexts and one group of the one or more groups. The memory is coupled to the processor and is configured to provide the processor with instructions.

20 Claims, 21 Drawing Sheets

(56) References Cited

U.S. PATENT DOCUMENTS

| | | | | |
|---|---|---|---|---|
| 2012/0239428 | A1* | 9/2012 | James | G06F 8/20 705/3 |
| 2013/0219211 | A1* | 8/2013 | Gopinath | G06F 11/1482 714/3 |
| 2013/0290515 | A1* | 10/2013 | Pemrick | G06F 17/3089 709/224 |
| 2014/0019634 | A1* | 1/2014 | Srinivasan | H04L 65/80 709/231 |
| 2014/0187269 | A1* | 7/2014 | Zinin | H04W 4/04 455/456.3 |

* cited by examiner 700 702

| Category Name | Category Value |
|---|---|
| Browser | Safari, Chrome, Native, Firefox, Skyfire, ie, Operamini, Operamobile, bolt, Openwave, Obigo, Telca, Netfront, Blazer, Polaris, Dolphin, Ucweb, Silk |
| Devicetype | Phone {Nontouchphone, Touchphone}, iphone, ipod, desktop, Tablet, ipad, ipadmini, Fire, Surface |
| OS | ios, Android, Blackberry, Windows, Bada, Webos, Symbian |
| Screen | Width[number] (eg. Width320) |
| Pixeldensity | dpiretina (ie. 261 and above), dpimedium (ie. 131-260), dpilow (ie. 130 and below) |
| Format | mp3, mp4, m4a, wmv, ogg, wav, mpeg, mov, flv, webm, h264, png, gif, jpg, jpeg, svg |
| Feature | css3, nocss3, offlinestorage, gps, nogps, noofflinestorage, fileupload, nofileupload, flash, noflash, cookies, nocookies, camera, nocamera, multilingual, nomultilingual, webkit, nowebkit, nojssupport,<br><br>jssupport {advancejssuport, basicjssupport}, html5, nohtml5, touch, notouch |

FIG. 7A 750 752

| Context Category Name | Context Category Value |
| --- | --- |
| Shoppingstyle | Price, Brand, Reviews, Social |
| Newsview | Politics, Sports, National, Local, Arts |
| Infodepth | Moreinfo, Normalinfo, Lessinfo |
| Sharingdepth | Moresharing, Normalsharing, Lesssharing |
| | |

FIG. 7B 800 802 804

| Operators (used for versions inside group definitions) | Symbol | Example |
|---|---|---|
| equal (exact value) | (none) | ios4 |
| greater than | _gt | ios4_gt |
| lesser than | _lt | ios4_lt |
| greater than or equal to | _ge | ios4_ge<br>ios5.2_ge |
| less than or equal to | _le | ios4_le |
| not | _not | ios4_not |
| range | to | ios4.1to4.8 |
| series (can be combined with other operators) | x | ios4x<br>ios4xto5x<br>ios4x_not |
| or | , | ios,android,firefox,tablet |
| and | + | safari+touchphone+ios4x |

| Keywords | Example |
| --- | --- |
| $action | $action="show"<br>$action="hide"<br>*$action is reserved by SmartPath at the HTML attribute level. |
| tg- | <img tg-iphone-$action="hide" /><br><tg-phonenumber>12345678</tg-phonenumber> |
| - (hyphen as separator) | [CSS attribute]<br>span {<br>float: left;<br>tg-g1-float:right<br>}<br><br>[Element attribute]<br><img src='url1" tg-gl -src="url2" > |

FIG. 9

WEB ASSET MODIFICATION BASED ON A USER CONTEXT

BACKGROUND OF THE INVENTION

Web assets are requested by a variety of devices with different characteristics and with different configurations—for example, these characteristics include the screen size and/or resolution, the browser, the player software, etc. In addition, different users have different browsing priorities and preferences. A customized web asset can be delivered for each different device, configuration, and user type. However, this is difficult to maintain because of the ever evolving number of different assets that must be kept up to date.

BRIEF DESCRIPTION OF THE DRAWINGS

Various embodiments of the invention are disclosed in the following detailed description and the accompanying drawings.

FIG. 7A is a table illustrating an embodiment of groups.

FIG. 7B is a table illustrating an embodiment of user contexts.

FIG. 8 is a table illustrating embodiments of operators.

FIG. 9 is a table illustrating an embodiment of a table of keywords.

DETAILED DESCRIPTION

Figure 1:
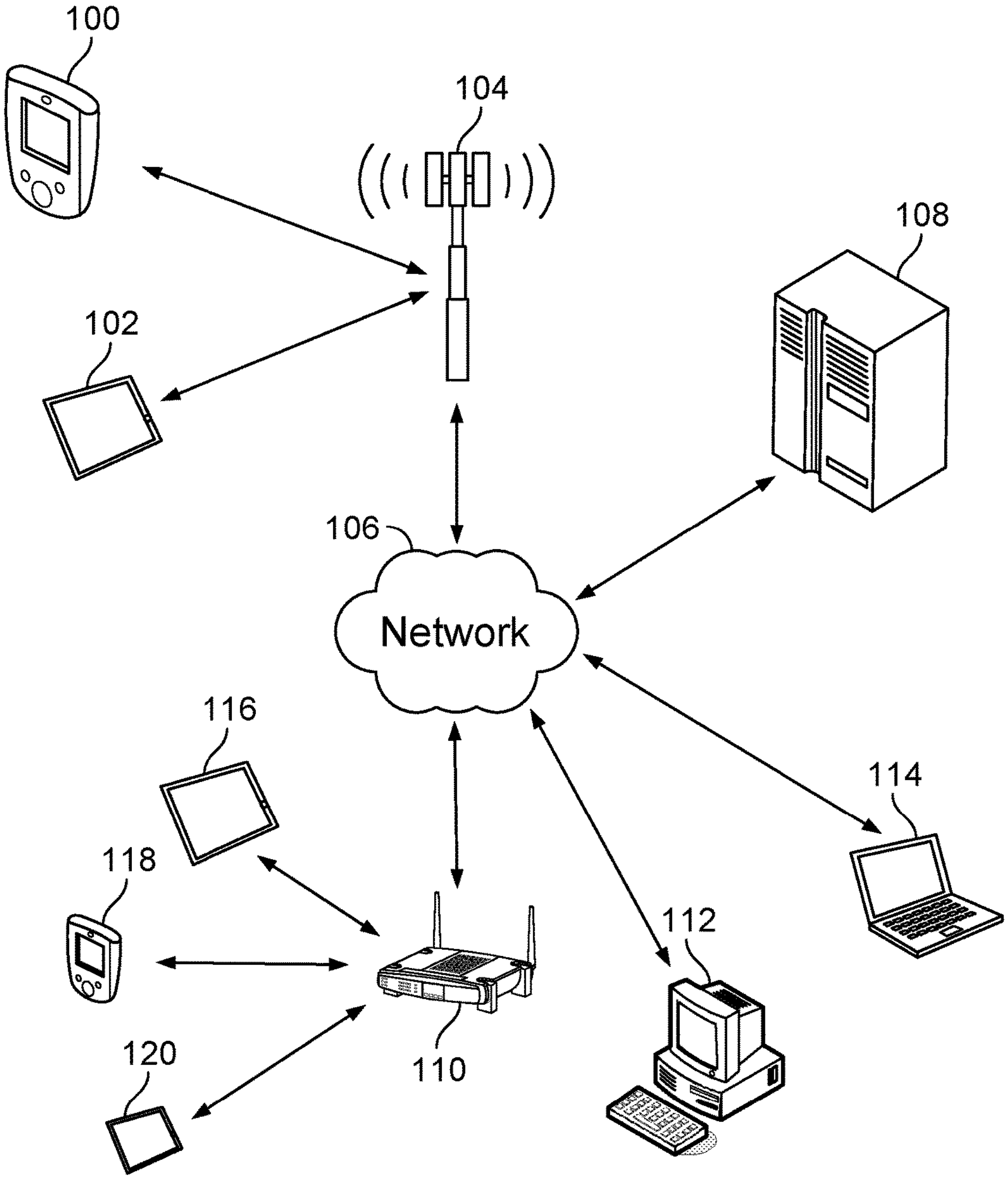
FIG. 1 is a diagram illustrating an embodiment of a system for web asset modification.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for web asset modification based on a user context is disclosed. The system comprises a processor and a memory. The processor is configured to: receive a request for a web asset for display on a device; receive an indication of one or more user contexts; determine one or more groups for the web asset, wherein each of the one or more groups comprises a group for adapting display of the web asset on the device; and modify the web asset based at least in part on one user context of the one or more user contexts and one group of the one or more groups. The memory is coupled to the processor and is configured to provide the processor with instructions.

In some embodiments, a system for providing web assets (e.g., a web page) to a device with a specific configuration includes determining a grouping associated with the request for the web asset. The system for providing web assets additionally receives a user context associated with the request for a web asset. In various embodiments, the context comprises a persona, personal preference indicator, a user associated information used to indicate an interface preference, or any other appropriate context. Based on the grouping and the user context, the web asset is modified according to custom instructions embedded in the web asset (e.g., an Hyper Text Markup Language (HTML) element that enables customization, a JavaScript™ element that enables customization, a cascading style sheet (CSS) element that enables customization, etc.). The modification of the web asset include the adding of group-specific and user context-specific steps, the hiding or removing of group-specific and user context-specific steps, and the changing of group-specific and user context-specific steps that are executed by the device to display the web asset. For example, the web asset includes custom instructions to display a full table of information for a laptop screen with a blue background and only an abbreviated table for a portable phone screen with a white background, and to display a list of products sorted by price for a user known to be price conscious, and a list of products sorted by review scores for a user known to be review conscious. In some embodiments, the web asset includes custom instructions based on a combination of group information and user context information. The custom instructions are used to modify the web asset so that a user of a laptop screen and a different user of a laptop screen receive a different web asset (e.g., HTML instructions, JavaScript instructions, CSS instructions, etc.) file that enables the customizations. In addition, the custom instructions are used to modify the web asset so that a user of a mobile device and a different user of a mobile device receive a different web asset (e.g., HTML instructions, JavaScript instructions, CSS instructions, etc.) file that enables the customizations. In some embodiments, the web asset custom instructions preserve web asset functionality (e.g., do not break the web asset code, can run or be executed or interpreted with the custom instructions embedded, etc.).

FIG. 1 is a diagram illustrating an embodiment of a system for web asset modification. In the example shown, a user of a device (e.g., phone 100, phone 118, tablet 102, tablet 116, mini tablet 120, desktop 112, laptop 114, etc.) requests a web asset via network 106 (e.g., a wireless network, a wired network, a cellular network, etc.). For example, network 106 communicates with phone 100 and tablet 102 via cellular infrastructure (e.g., cell tower 104) or via a wireless infrastructure (e.g., wireless router 110). The web asset request is serviced by server 108. In order to adapt the requested web asset to the device with its software and hardware environment, server 108 determines the software and hardware environment associated with the request. For example, a specific device identifier enables classification of the device, and its screen resolution and its size (e.g., iPhone 3GS with it associated 3.5 inch screen with 320×480 pixels). And for example, a browser identifier enables classification of a software environment (e.g., chrome browser). Server 108 additionally determines a user context associated with the request. In various embodiments, the user context is determined by querying the user for a desired user context, by looking up user identifying information (e.g., IP address, software identifying information, usernames, etc.) in a user context table, by querying a user context identification service with user identifying information, or in any other appropriate way. Once the hardware and software environment and user context are determined, a pre-processor indicates a customization (e.g., a customization grouping, a customization identifier, etc.). In some embodiments, one or more user context cookies (e.g., SN1024Context1, SN1024Context2) are set appropriately based on the information retrieved from the database or user context table. The request is forwarded to a backend server, which provides the web asset in its generalized form (e.g., an HTML page). The generalized form of the web asset is then post-processed at the web server based on the device type and user context type determined earlier. The post-processing of the generalized form of the web asset interprets customized, but native language acceptable, codes (e.g., attributes, tags, etc.) to modify, remove, or add to the web asset.

Figure 2A:
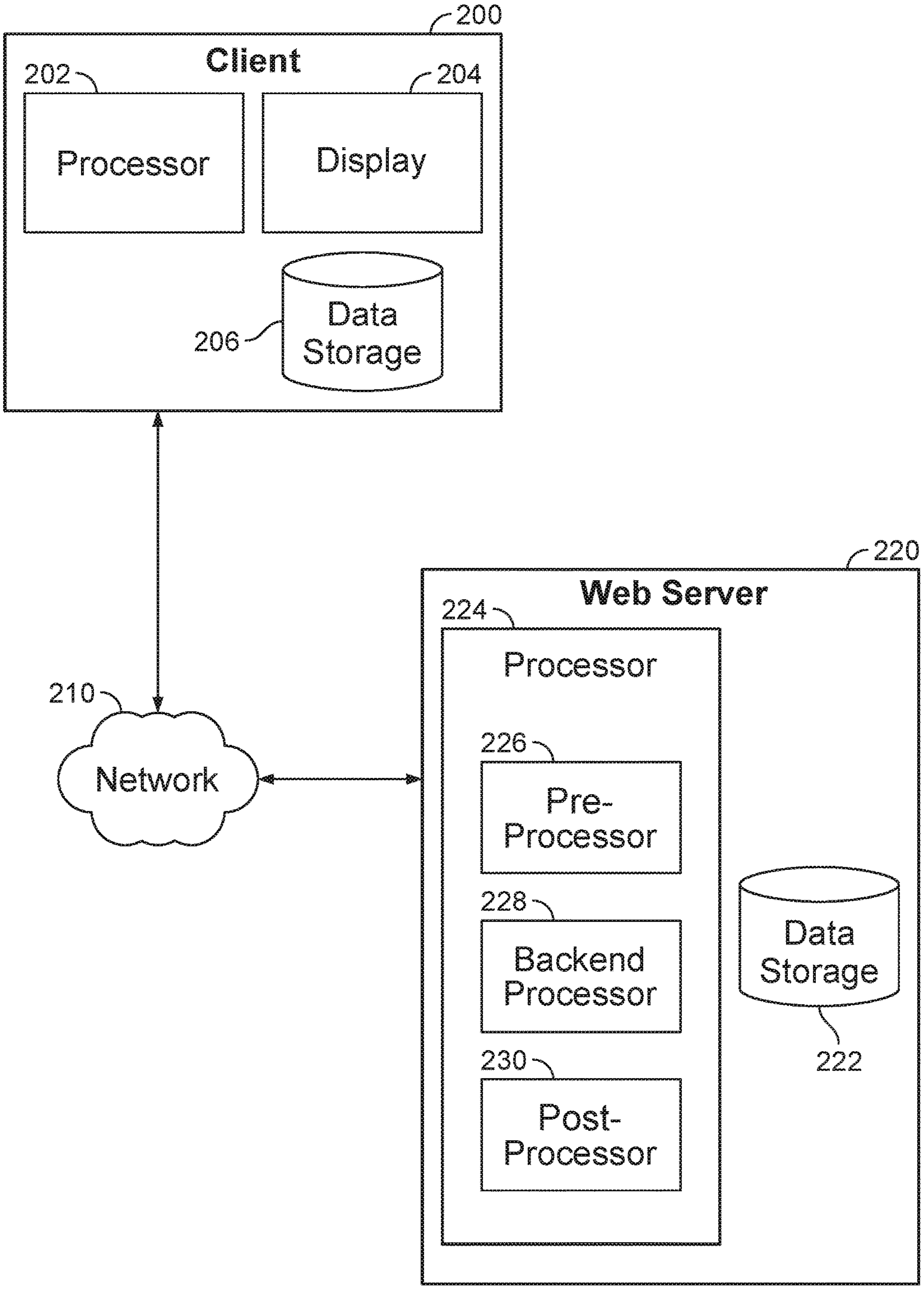
FIG. 2A is a block diagram illustrating an embodiment of a system for web asset modification.

FIG. 2A is a block diagram illustrating an embodiment of a system for web asset modification. In the example shown, client 200 comprises processor 202, display 204, and data storage 206. A user of client 200 requests a web asset—for example, a user indicates by clicking in a browser (e.g., running using processor 202 of client 200) on a link displayed on display 204. The indication causes a request to be sent to web server 220 via network 210 to retrieve a web asset associated with the link associated with the request. Network 210 represents a set of wireless and/or wired communication networks (e.g., including routers, servers, data storage units, processors, connectivity infrastructure, etc.) that enable the request and the subsequent response to the request to be conveyed between client 200 and web server 220 that responds to the request. In various embodiments, the indication comprises one or more of the following: a typed in web address, a request for retrieval of a web asset initiated by code running on the browser (e.g., an ad retrieval), a clicking of a link, a search for a web site, an application running on a device requesting a web asset, or any other appropriate indication. Web server 220 comprises processor 224 and data storage 222. Processor 224 includes software or hardware modules performing pre-processor 226 functionality, backend processor 228 functionality, and post-processor 230 functionality. Pre-processor 226 functionality includes receiving a request for a web asset and determining one or more associated groups and one or more associated user contexts that have similar web asset requirements (e.g., get the same web page portrayal). In some embodiments, pre-processor 226 functionality includes determining a user context based on the received web asset. Backend processor 228 functionality comprises exiting web asset retrieval based on a received request (e.g., current technology solution for web page request fulfillment). Post-processor 230 functionality includes receiving the retrieved web asset from backend processor 228 and processing the web asset based at least in part on the determined group(s) and user context(s). Post-processor 230 adds to, modifies, or removes web asset elements based on embedded instructions that are compatible with the regular web asset elements. The web asset is stored on data storage 222 of web server 220 both prior to post processing (e.g., as retrieved using backend processor 228), during post-processing, and just prior to providing to the requestor. Web asset as modified by post-processor 230 is then provided to client 200 via network 210 and stored on data storage 206. Web asset as stored in data storage 206 is displayed for the user using display 204 and processor 202.

Figure 2B:
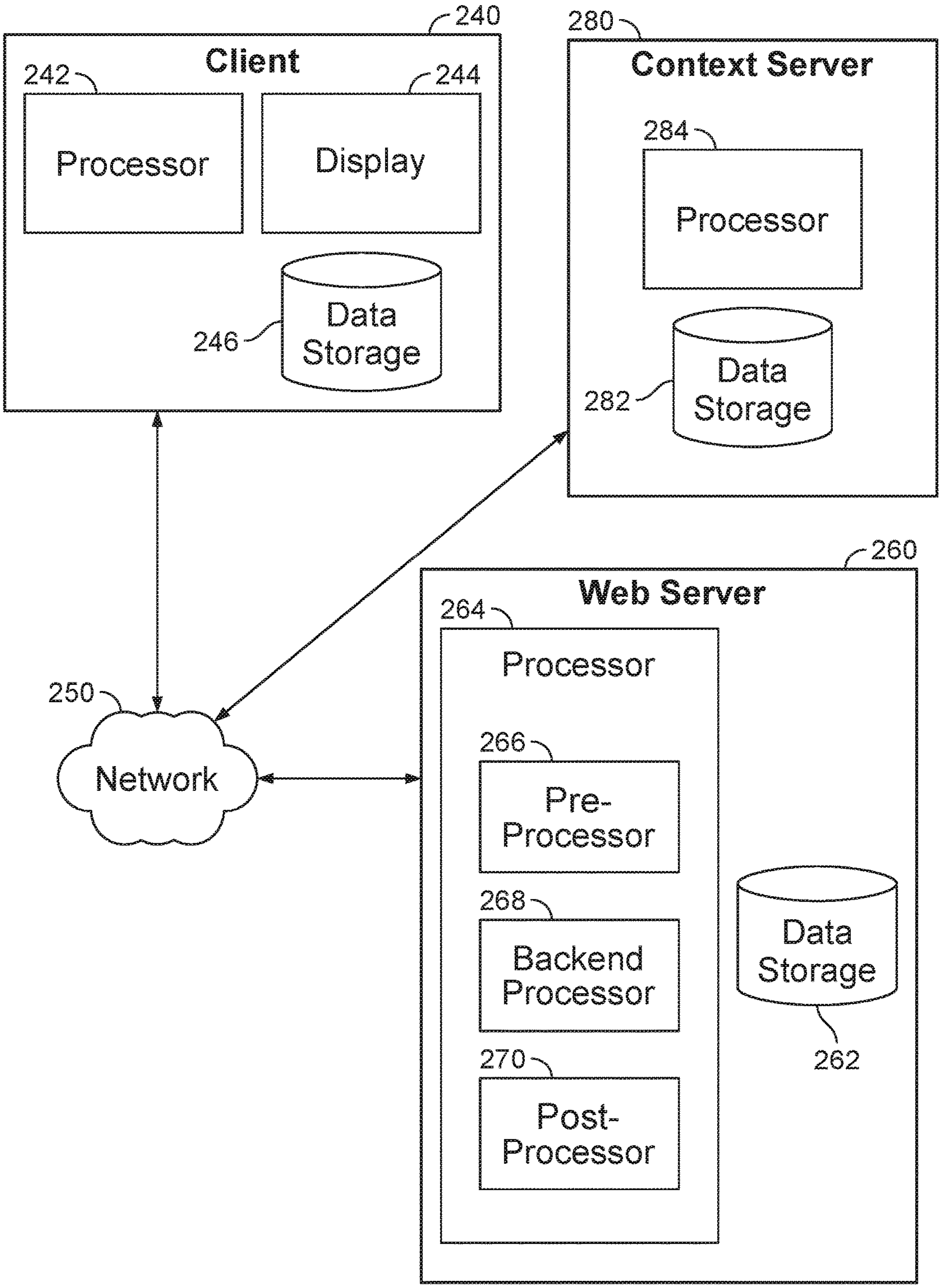
FIG. 2B is a block diagram illustrating an embodiment of a system for web asset modification.

FIG. 2B is a block diagram illustrating an embodiment of a system for web asset modification. In the example shown, client 240 comprises processor 242, display 244, and data storage 246. A user of client 240 requests a web asset—for example, a user indicates by clicking in a browser (e.g., running using processor 242 of client 240) on a link displayed on display 244. The indication causes a request to be sent to web server 260 via network 250 to retrieve a web asset associated with the link associated with the request. Network 250 represents a set of wireless and/or wired communication networks (e.g., including routers, servers, data storage units, processors, connectivity infrastructure, etc.) that enable the request and the subsequent response to the request to be conveyed between client 240 and web server 260 that responds to the request. In various embodiments, the indication comprises one or more of the following: a typed in web address, a request for retrieval of a web asset initiated by code running on the browser (e.g., an advertisement retrieval), a clicking of a link, a search for a web site, an application running on a device requesting a web asset, or any other appropriate indication. Web server 260 comprises processor 264 and data storage 262. Processor 264 includes software or hardware modules performing pre-processor 266 functionality, backend processor 268 functionality, and post-processor 270 functionality. Pre-processor 266 functionality includes receiving a request for a web asset and determining one or more associated groups and one or more user context(s) that has/have similar web asset requirements (e.g., all get the same web page portrayal). In some embodiments, pre-processor 266 functionality comprises requesting a user context (e.g., from context server 280). Backend processor 268 functionality comprises exiting web asset retrieval based on a received request (e.g., current technology solution for web page request fulfillment). Post-processor 270 functionality includes receiving the retrieved web asset from backend processor 268 and processing the web asset based at least in part on the determined group(s) and user context(s). Post-processor 270 adds to, modifies, or removes web asset elements based on embedded instructions that are compatible with the regular web asset elements. The web asset is stored on data storage 262 of web server 260 both prior to post processing (e.g., as retrieved using backend processor 268), during post-processing, and just prior to providing to the requestor. Web asset as modified by post-processor 270 is then provided to client 240 via network 250 and stored on data storage 246. Web asset as stored in data storage 246 is displayed for the user using display 244 and processor 242. Context server 280 comprises processor 284 and data storage 282. Context server 280 comprises a context server for determining a context associated with a user making a web asset request (e.g., the user of client 240). In various embodiments, context server 280 determines a user context based on information stored in the web asset request, determines a user context by looking up information stored in the web asset request in a table of stored user context information, determines the user context based on previous user action(s), determines the user context based on a previously indicated user context, or determines the user context in any other appropriate way. In some embodiments, context server 280 receives data describing user actions from one or more web servers (e.g., web servers as in web server 260) and determines a user context based on the received user data.

Figure 3:
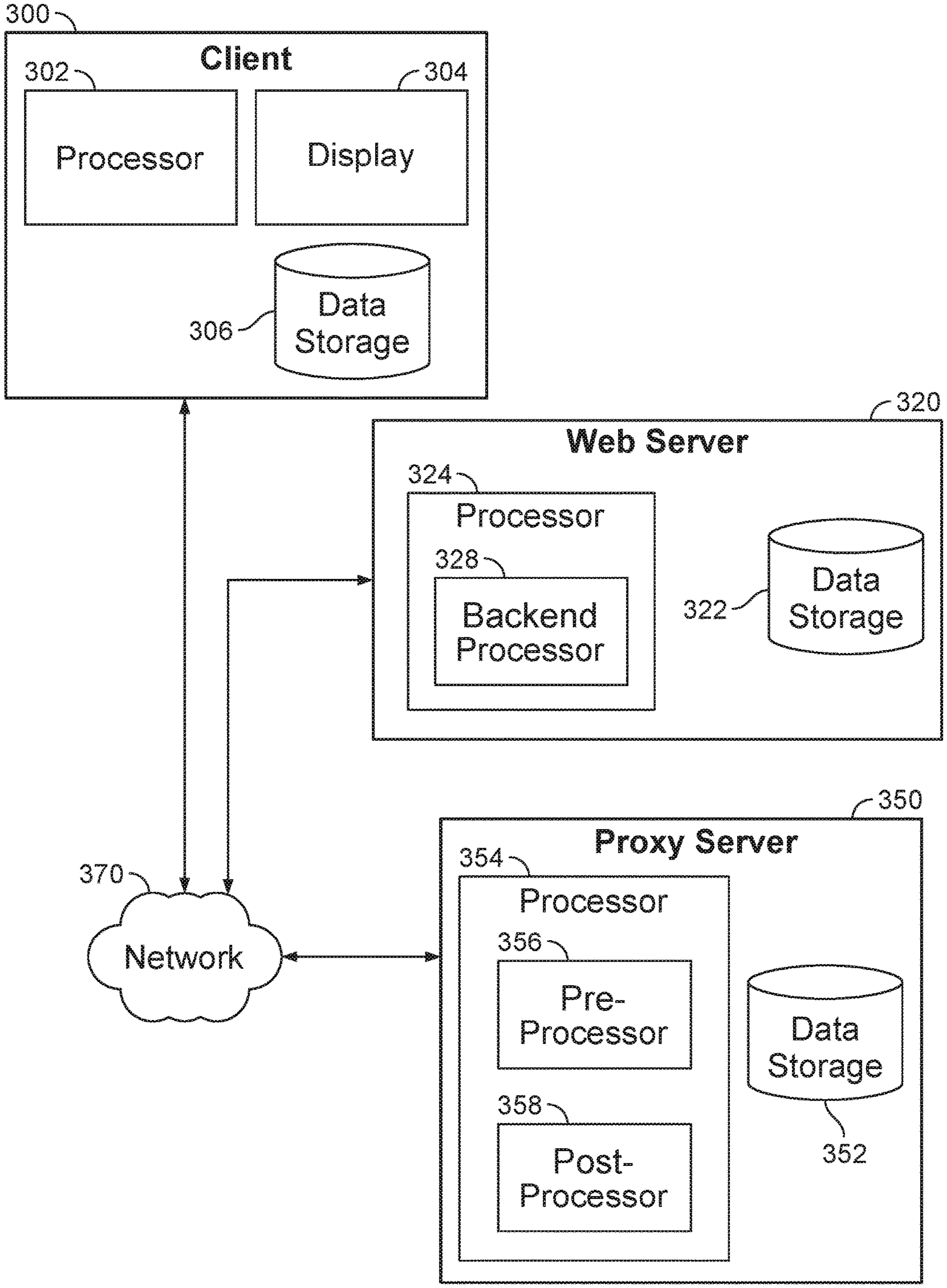
FIG. 3 is a block diagram illustrating an embodiment of a system for web asset modification.

FIG. 3 is a block diagram illustrating an embodiment of a system for web asset modification. In the example shown, client 300 comprises processor 302, display 304, and data storage 306. In various embodiments, data storage 306 comprises one or more of the following: a solid state memory (e.g., a random access memory, a chip memory, etc.), a magnetic memory (e.g., a hard disk, a magnetic disk, a tape, a magnetic random access memory, etc.), or any other appropriate memory. A user of client 300 requests a web asset—for example, a user indicates by clicking in a browser (e.g., running using processor 302 of client 300) on a link displayed on display 304. The indication causes a request to be sent to web server 320 via network 370 and via proxy server 350 to retrieve a web asset associated with the link associated with the request. Network 370 represents a set of wireless and/or wired communication networks (e.g., including routers, servers, data storage units, processors, connectivity infrastructure, etc.) that enable the request and the subsequent response to the request to be conveyed between client 300 and web server 320 and proxy server 350 that both respond to the request. In various embodiments, the indication comprises one or more of the following: a typed in web address, a request for retrieval of a web asset initiated by code running on the browser (e.g., an ad retrieval), a clicking of a link, a search for a web site, an application running on a device requesting a web asset, or any other appropriate indication. Web server 320 comprises processor 324 and data storage 322. Processor 324 includes software or hardware modules performing backend processor 328 functionality. Proxy server 350 comprises processor 354 and data storage 352. In various embodiments, data storage 352 comprises one or more of the following: a solid state memory (e.g., a random access memory, a chip memory, etc.), a magnetic memory (e.g., a hard disk, a magnetic disk, a tape, a magnetic random access memory, etc.), or any other appropriate memory. Processor 354 includes software or hardware modules performing pre-processor 356 functionality and post-processor 358 functionality. Pre-processor 356 functionality includes receiving a request for a web asset and determining one or more associated groups and one or more associated user contexts that have similar web asset requirements (e.g., get the same web page portrayal). Backend processor 328 functionality comprises exiting web asset retrieval based on a received request (e.g., current technology solution for web page request fulfillment). Post-processor 358 functionality includes receiving the retrieved web asset from backend processor 328 and processing the web asset based at least in part on the determined group(s) and user context(s). Post-processor 358 adds to, modifies, or removes web asset elements based on embedded instructions that are compatible with the regular web asset elements. The web asset is stored on data storage 322 of web server 320 prior to post-processing (e.g., as retrieved using backend processor 328). The web asset is stored on data storage 352 during post-processing and just prior to providing to the requestor. Web asset as modified by post-processor 354 is then provided to client 300 via network 370 and stored on data storage 306. In some embodiments, data storage 306 comprises a temporary memory used for temporary storage of data. Web asset as stored in data storage 306 is displayed for the user using display 304 and processor 302.

Figure 4:
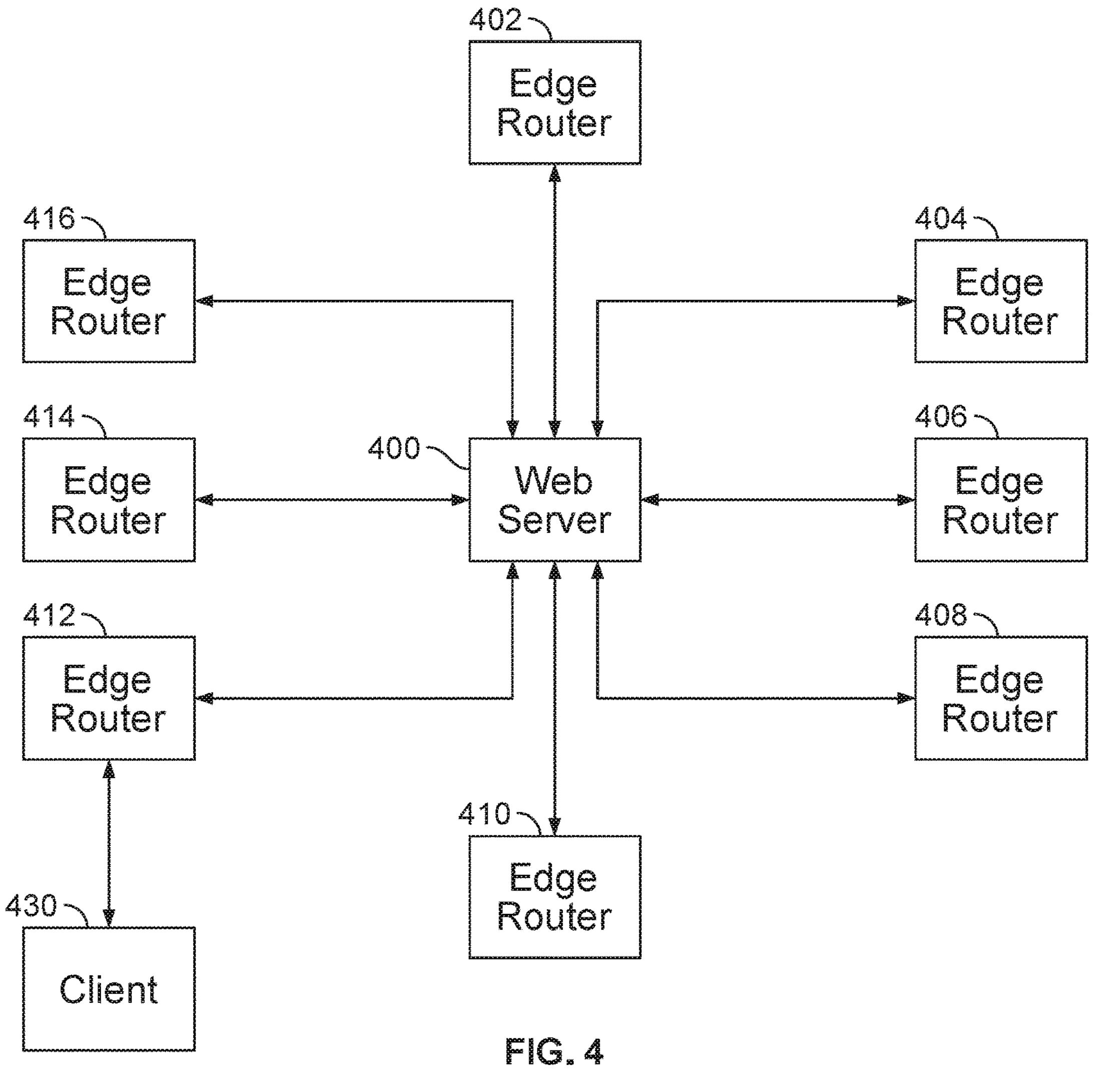
FIG. 4 is a block diagram illustrating an embodiment of a system for web asset modification.

FIG. 4 is a block diagram illustrating an embodiment of a system for web asset modification. In the example shown, client 430 requests a web asset from web server 400 via an edge router (e.g., edge router 402, edge router 404, edge router 406, edge router 408, edge router 410, edge router 412, edge router 414, and edge router 416). Web server 400 includes backend processing that stores and retrieves the web asset so that it can be provided to the user in response to the request. Pre-processing is performed in an edge router to determine a grouping and a user context for modification and post-processing based at least in part on the grouping and user context.

Figure 5:
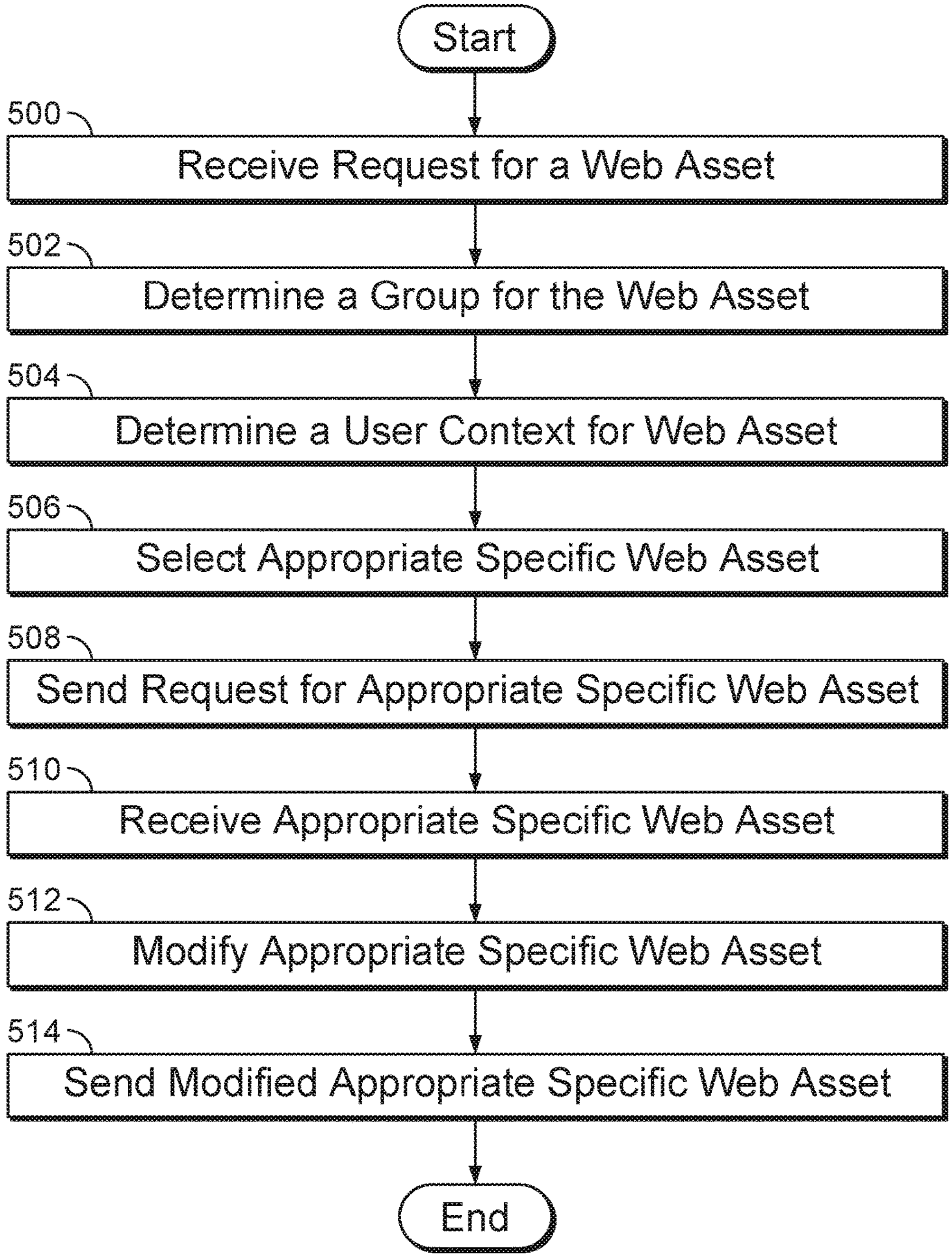
FIG. 5 is a flow diagram illustrating an embodiment of a process for modifying a web asset.

FIG. 5 is a flow diagram illustrating an embodiment of a process for modifying a web asset. In the example shown, in 500 a request is received for a web asset. For example, a pre-processor module receives a request from a device requesting a web asset (e.g., a web page). In 502, one or more groups for the web asset is/are determined. For example, based on associated information in the web asset request one or more groups is/are determined (e.g., a grouping that will receive the same web asset information to display and that is adapted for display on the device as appropriate for its hardware and software environment). In 504, it is determined whether there is a user context for the web asset. For example, the request is analyzed to see if information in the request can identify a user context for the user (e.g., using browser, cookie, or IP address information or information in the request itself to point to an associated user context such as select a user context from a set of user contexts or to point to a database to determine a user context). In the event that it is determined that there is a user context, in 504, a user context is determined for the web asset and control passes to 506. In some embodiments, one or more user contexts are determined for the web asset. In various embodiments, a user context is determined from the request, from stored user data, from a previously indicated user context, by querying a user context server, or in any other appropriate way. In the event that it is determined that there is not a user context, control passes to 506. In 506, an appropriate specific web asset is selected. For example, based on the grouping and/or user context, a web asset is selected to be retrieved from a server (e.g., a backend server). In some embodiments, a grouping and/or user context determines whether a web asset that includes flash or does not include flash is selected. In 508, a request for the appropriate specific web asset is sent. For example, a pre-processing module sends a request for a web asset to a backend server. In 510, the appropriate specific web asset is received. In 512, the appropriate specific web asset is modified. In various embodiments, the appropriate specific web asset is modified based on the group, based on the user context, based on the user context and the group, or based on any combination of group(s) and/or user context(s). For example, the syntax of the web asset is analyzed to locate embedded customization instructions. These instructions then are used to add to, to modify, or to remove web asset elements. In 514, the modified appropriate specific web asset is sent. For example, once the web asset has been customized, it is sent to the requestor.

Figure 6:
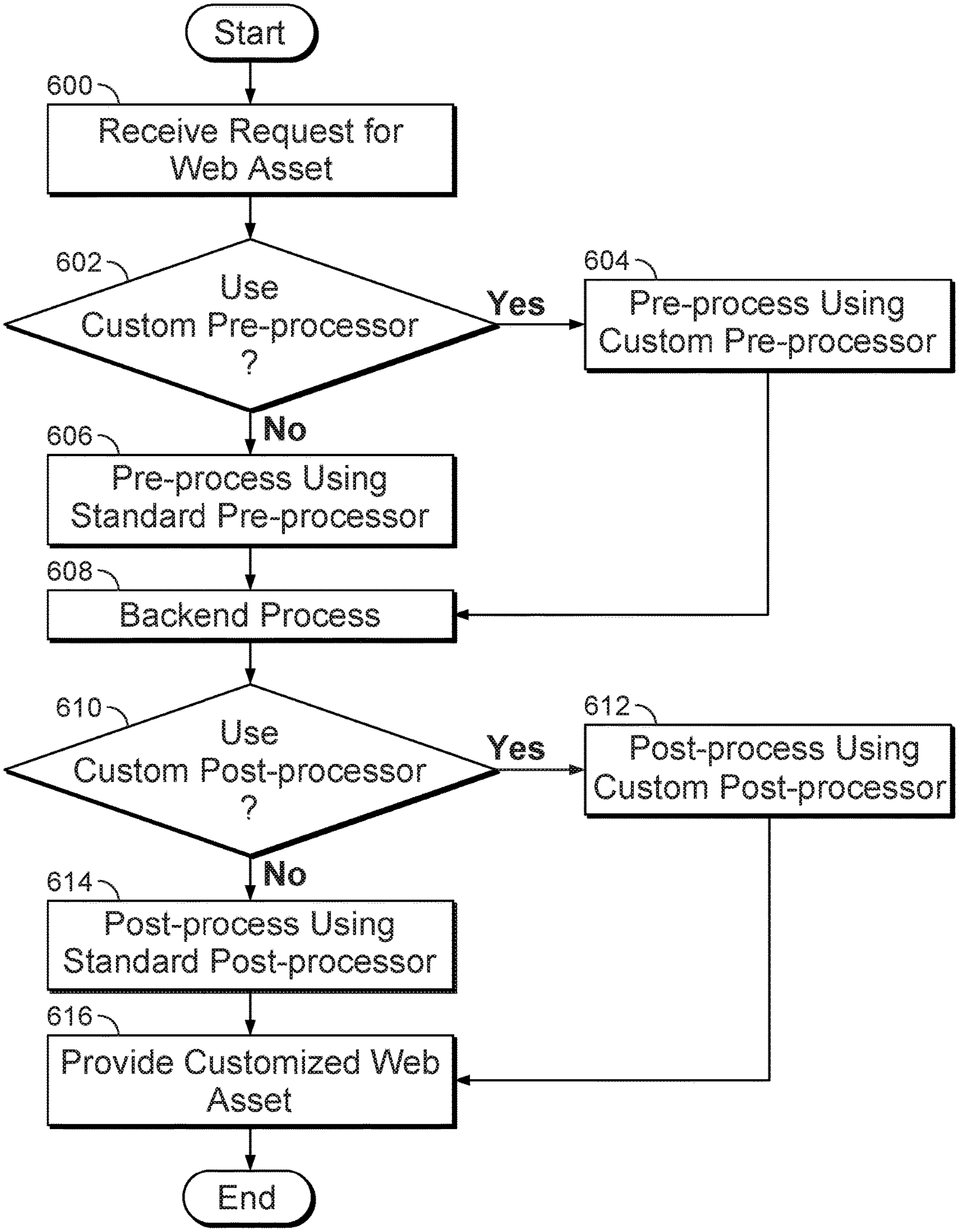
FIG. 6 is a flow diagram illustrating an embodiment of a process for web asset modification.

FIG. 6 is a flow diagram illustrating an embodiment of a process for web asset modification. In the example shown, in 600 a request is received for a web asset. For example, a user using a device (e.g., a mobile device) hits the server for a web page. In 602, it is determined whether to use a custom pre-processor. In the event that a custom pre-processor is to be used, then in 604 pre-processing using a custom pre-processor is performed, and control passes to 608. In the event that a custom pre-processor is not to be used, then in 606 pre-processing using a standard pre-processor is performed, and control passes to 608. In some embodiments, pre-processing includes finding one or more groups and/or one or more user contexts, storing the one or more groups value(s) and/or the one or more user context value(s) in a memory, and requesting/receiving the appropriate web asset. In 608, backend processing is performed. For example, backend processing includes receiving a request to provide an appropriate web asset and providing the web asset (e.g., a request for a web page and providing the web page). In 610, it is determined whether a custom post-process is to be used. In the event that a custom post-process is to be used, then in 612 post-processing using a custom post-processor is performed, and control passes to 616. In the event that a custom process is not to be used, then in 614 a standard post-processing using a post-processor is performed, and control passes to 616. In some embodiments, post-processing includes modifying web assets according to rules provided in the web asset as interpreted by the post-processor. In 616, a customized web asset is provided. For example, a web asset that has been modified is provided to the requestor of the web asset (e.g., an optimized web page for a mobile device).

A system for web asset modification is disclosed. Web asset modification provides an efficient way to address the complexity presented by the diverse means of internet access today. The system engine integrates with any Java server and allows content creators to efficiently manipulate content without having to delve into the complexity of the mobile landscape. Web asset modification instructions are embedded into a web asset (e.g., HyperText Markup Language (HTML), Cascading Style Sheets (CSS), etc.), which is parsed by the system engine and rendered according to the device requesting the page. At the core of the system engine are the concepts of groups and user contexts. A group is used to target a set of devices, and a user context is used to target a set of users. They are either selected from a pre-defined list (e.g., a predefined device group or a predefined user context) or is defined according to the needs of a developer (e.g., as defined using a syntax), using a broad range of device attributes. Logical operators further extend flexibility in defining groups and contexts enabling customization of web assets.

In some embodiments, the set of groups is broken into subsets of group categories—for example browser, device type, operating system (OS), screen, etc. Each group category comprises a set of groups—for example, the OS group category comprises iOS™, Android™, Blackberry™, Windows™, Bada, webOS®, Symbian, etc. The groups reflect characteristics of devices (e.g., hardware or software characteristics). In some embodiments, the device characteristics can be determined from a web asset request (e.g., based on associated information in the web asset request, e.g., via a HyperText Transfer Protocol (HTTP) request user agent string).

In some embodiments, a user context of a set of user contexts reflects characteristics of the user operating the device. In some embodiments, a user self-identifies with a particular user context (e.g., the user is presented with a list of options for viewing the website and selects the one he or she identifies with the best). In some embodiments, user activity on a website is monitored and used to determine an appropriate user context. In some embodiments, user activity at various websites is monitored (e.g., by a third party user context server) and used to determine an appropriate user context. A web asset creator can create any appropriate set of user contexts appropriate for the web asset (e.g., a news website could have a set of user contexts describing the favorite news section of the user; a shopping website could have a set of user contexts describing the preferred shopping behavior of the user). In some embodiments, a user context is determined based at least in part on the same information used to determine a group (e.g., information in the web asset request). In some embodiments, a user context is determined based at least in part on a determined group or groups. In some embodiments, a usercontext is determined independently from groups.

In some embodiments, web asset modification for HTML type assets includes attribute overwriting. For example, rules to overwrite HTML attributes have the syntax form of tg-groupname-attribute=value or tg-contextname-attribute=value. A sample rule which overwrites a green background color to blue for safari browser or price-conscious users is as follows: <div style="background-color: green" tg-safari,price-style="background-color: blue; margin:-2px"; />. Note that multiple groups and user contexts can be separated by comma(s) without any restrictions—for example, a combination of custom group(s), pre-defined group(s), custom user context(s), and/or pre-defined user context(s). As another example, rules to show and hide HTML attributes have the form of: tg-groupname=value or tg-contextname=value, where the value is "hide" or "show". In another example, a div which is only to be shown to devices that fall into mygroup 1 or price-conscious users is represented as <div tg-mygroup 1,price="show"/>.

In some embodiments, web asset modification for JavaScript type assets includes overwriting, showing and hiding. For example, rules to show and hide JavaScript snippets within the code have the form of <script tg-groupname=value/> or <script tg-contextname=value/>, where value is "hide" or "show". For another example, the snippet below will only be displayed on iPhone devices (devicetype=phone AND os=iOS). Note the use of '+' for an AND operation.

```
<script tg-ioslowbandwidth="show">
alert("This is an iPhone!");
</script>
<script tg-lowbandwidth="show">
alert("This device is on a lowbandwidh!");
</script>
```

In some embodiments, web asset modification for CSS type assets includes attribute overwriting. For example, rules within the CSS code result in the CSS being selectively rendered according to the device requesting the page. CSS rules are similar to HTML rules. The CSS syntax has the form: tg-groupname-attribute:value or tg-contextname-attribute:value. In the example below, the float: left property is overridden for user context of price-conscious users:

```
#mydivId
{
  float: left;
  tg-price-float:right;
}
```

In some embodiments, rules are used to manipulate link tags: <link rel="stylesheet" href="small.css" tg-iphone-href="big.css" tg-price="hide"/>. In the example, big.CSS is used for iPhone devices, a link is hidden for BlackBerry devices, and small.css is used for all other devices. In another example, CSS rules are used to hide and show style tags. This is useful for limiting the CSS that is sent to a certain category of devices or user contexts. For example,

```
<style tg-price="hide" type="text/css">
#id1
{
  color: blue;
  font-size: 12px;
}
</style>
```

In some embodiments, web asset modifications use groups to target experiences and functionality to defined sets of users (e.g., iPhone users, Tablet users, price-conscious users, social users, etc.). The framework allows users to use:

Pre-defined groups and user contexts: These are provided by the framework to quickly target commonly used device categories. Pre-defined groups and user contexts are directly used within the HTML or CSS as follows: <div style="background-color: green" tg-iphone-style="background-color: blue; margin:-2px"; /> or <div style="background-color: red" tg-social-style="background-color: white; margin:-2px"; />. Here, tg is a unique prefix to identify web asset modification specific syntax and iphone is a pre-defined group constant and social is a pre-defined user context constant.

Custom groups and user contexts: These are user-defined entities which are a combination of predefined group and user context constants. For example, a user can target firefox browsers with social users by combining multiple categories:

```
<CustomEntity name="socialfirefox">
  <Category name="browser" value="firefox"/>
  <Category name="shoppingstyle" value="social"/>
</CustomEntity>
```

This CustomEntity is used in HTML as follows: <div style="background-color: green" tg-socialfirefox-style="background-color: blue; margin:-2px"; />

FIG. 7A is a table illustrating an embodiment of groups. In the example shown, groups are used to target experiences and functionality to defined sets of devices. The framework allows users to use pre-defined groups or define custom groups by picking attributes of the devices that would fall into that category. Categories 700 include browser, devicetype, os, screenwidth, dpi, format, and feature. Pre-defined groups 702 are as follows:

1) for browser: safari, chrome, native, firefox, skyfire—e.g., operamini, operamobile, bolt, openwave, obigo, telca, netfront, blazer, polaris, dolphin, ucweb, and silk;
2) for devicetype: phone {nontouchphone, touchphone}, iphone, ipod, desktop, tablet, ipad, ipadmini, fire, and surface;
3) for os: ios, android, blackberry, windows, bada, webos, and symbian;
4) for screenwidth: width[number] (e.g., width320);
5) for pixeldensity or dpi, dpiretina (e.g., 261 and above), dpimedium (e.g., 131-260), and dpilow (e.g., 130 and below);
6) for format: mp3, mp4, m4a, wmv, ogg, way, mpeg, mov, fly, webm, h264, png, gif, jpg, jpeg, and svg;
7) for feature: css3, nocss3, offlinestorage, noofflinestorage, gps, nogps, fileupload, nofileupload, flash, noflash, cookies, nocookies, camera, nocamera, multilingual, nomultilingual, webkit, nowebkit, jssupport {advancejssuport, basicjssupport}, nojssupport, html5, nohtml5, touch, and notouch.

FIG. 7B is a table illustrating an embodiment of user contexts. In the example shown, user contexts are used to target experiences and functionality to defined sets of users. The framework allows users to use pre-defined user contexts, custom user contexts by picking attributes of the user contexts that would fall into that category, or create new categories of user contexts based on their needs. Context category names 750 include shoppingstyle, newsview, infodepth, and sharingdepth. context category value 752 are as follows:

1) for shoppingstyle: price, brand, reviews, and social;
2) for newsview: politics, sports, national, local, and arts;
3) for infodepth: moreinfo, normalinfo, and lessinfo;
4) for sharingdepth: moresharing, normalsharing, and lesssharing.

In some embodiments, user contexts are defined for a group of users for whom it is desired that they experience the system in a particular way or manner.

In various embodiments, a user context of the one or more user contexts comprises one of the following: a user behavior, a user location, a user category, a user access channel, a user social network, a user shopping style, a user info depth, or any other appropriate user context. In various embodiments, a user behavior comprises one of the following: a politics interest, a sports interest, a price interest, a brand interest, or any other appropriate user behavior. In various embodiments, a user behavior comprises one of the following: a politics interest, a sports interest, a price interest, a brand interest, or any other appropriate user behavior. In various embodiments, user category comprises one of the following: a premium user, a female user, a senior user, an AB testing user, or any other appropriate user category. In various embodiments, a user access channel comprises one of the following: a low speed network, a 3G network, a Wi-Fi network, or any other appropriate user access channel. In various embodiments, a user social network comprises one of the following: FACEBOOK™, MYSPACE™, INSTAGRAM™, TWITTER™, or any other appropriate social network. In various embodiments, a user shopping style comprises one of the following: social, review, price, brand, or any other appropriate style. In various embodiments, a user info depth comprises one of the following: more info, normal info, less info, or any other appropriate information depth. In various embodiments, a group comprises one of the following: a phone group, a tablet group, a smart TV group, a Firefox browser group, an IOS group, a 7 inch screen group, or any other appropriate group.

In some embodiments, custom groups or custom user contexts are defined in a file and are common for all accessing the server. In some embodiments, custom groups or custom user contexts are defined in a file that is accessible or associated with a specific set of requestors or IP addresses.

In some embodiments, a custom entity definition is of the form:

```
<Group name=“groupName”>
  <Category name=“browser” value=“safari, firefox”/>
  <Category name=“os” value=“android2.2_ge”/>
  <Category name=“devicetype” value=“tablet”/>
  <Category name=“screen” value=“width320, width450_gt”/>
  <Category name=“pixeldensity” value=“dpiretina”/>
  <Category name=“feature” value=“gps, html5, camera”/>
  <Category name=“format” value=“mp3,mp4,jpg”/>
</Group>
```

In some embodiments, a custom user context definition is of the form:

```
<Group name=“contextName”>
  <Category name=“shoppingstyle” value=“reviews, social”/>
  <Category name=“infodepth” value=“moreinfo”/>
  <Category name=“sharingdepth” value=“moresharing”/>
</Group>
```

In some embodiments, a custom entity and custom user context definition is of the form:

```
<Group name=“ContextandDeviceName”>
  <Category name=“Context” value=“lowbandwidth”/>
  <Category name=“devicetype” value=“phone”/>
</Group>
```

Note that values within each category separated by comma ‘,’ are OR’ed, while the categories themselves are AND’ed to create the group or the user context. For example, the group chromeOnPhones below targets chrome browser AND the OS is either (ios or android) AND devicetype is phone:

```
<Group name=“chromeOnPhones”>
  <Category name=“browser” value=“chrome”/>
  <Category name=“os” value=“ios,android”/>
  <Category name=“devicetype” value=“phone”/>
</Group>
```

Values within each category separated by plus sign ‘+’ are AND’ed. For example, the user context SocialLearner below targets a user that desires more knowledge AND wants social sharing:

```
<Context name=“SocialLearner”>
  <Category name=“sharingdepth” value=“moresharing”/>
  <Category name=“infodepth” value=“moreinfo”/>
</Context>
```

Custom groups or custom contexts also offer the power of combining AND and OR operations. For example, the group myAndroid2 below targets android OS AND has either (html5 OR (both css3 AND offlinestorage)) features:

```
<Group name=“myAndroid2”>
  <Category name=“os” value=“android”/>
  <Category name=“feature” value=“html5,css3+offlinestorage”/>
</Group>
```

In some embodiments, custom groups are able to use any category name and/or category value (e.g., in a list of pre-defined groups) in any combination as part of their definition.

In some embodiments, templates are used to invoke packaged modules within the system framework, which offer compatibility across a range of devices and easy integration of complex features that otherwise might require multiple compatibility and rendering checks. Templates are invoked using the syntax (starts with <tg-):

```
<tg-templatename attribute1=“v1” attribute2=“v2” . . . >
```

The attributes & inner HTML of the template element depend on the template design. Consider a template—myphonenumber. The template filename should start with “tg-” followed by the templatename and ends with “.template”—for example, tg-myphonenumber.template. The template can be created just like an HTML page—HTML elements and styles should be specified with device specific display rules if needed.

```
<html>
  <body>
    <div tg-iphone=“show”>
      <a href=“tel:${XPATH=tg-myphonenumber}” style=“color:blue;”>Click Me</a>
    </div>
    <div tg-iphone=“hide”>
      <span style=“color:green;”>Please call ${XPATH=tg-myphonenumber}</span>
    </div>
  </body>
</html>
```

In this example, the click to call link is to be shown for iPhones, while other devices see the phone number in plain text. XPATH expressions are used to obtain the content from the template invocation in the user’s HTML code. XPATH syntax in template definitions starts with “${XPATH=” and ends with “}”. The value should be the exact xpath expression from where the data is to be extracted. Note: The root node is tg-myphonenumber so the /html/body path ({XPATH=/html/body/tg-myphonenumber}) doesn’t have to be specified. Usage of a template within HTML is as follows:

```
<html>
  <body><tg-myphonenumber>1234567890</tg-myphonenumber></body>
</html>
```

In this example, the inner HTML (e.g., 1234567890) of the tg-myphonenumber element is grabbed by the xpath expression specified on the template file. The final rendered html page when accessed from an iPhone device is as follows:

```
<html>
  <body><div>
    <a href=“tel:1234567890” style=“color:blue”>Click Me</a>
  </div></body>
</html>
```

The output for non-iPhone devices is as follows:

```
<html>
  <body><div>
    <span style=“color: green”>Please call 1234567890</span>
  </div></body>
</html>
```

FIG. 8 is a table illustrating embodiments of operators. In the example shown in FIG. 8, operators supported within group or user context definitions are shown. An operator is the last set of characters except in the event that there is range information provided with an operator that operate on both group and user context definitions and on the attribute level. Operators 800 are shown with corresponding symbol 802 and example 804. For example, operator 'equal' (exact value) has no corresponding symbol, and an example of usage as 'ios4'. Also, operator 'greater than' has symbol '_gt', and an example of usage as 'ios4_gt'. Operator 'less than' has symbol '_lt', and an example of usage as 'ios4_lt'. Operator 'greater than or equal to' has symbol '_ge', and examples of usage as 'ios4_ge' or 'ios5.2_ge'. Operator 'less than or equal to' has symbol '_le', and an example of usage as 'ios4_le'. Operator 'not' has symbol '_not', and an example of usage as 'ios4_not'. Operator 'range' has symbol 'to', and an example of usage as 'ios4.1to4.8'. Operator 'series' (can be combined with other operators) has symbol 'x', and examples of usage as 'ios4x' or 'ios4xto5x' or 'io4x_not'. Operator 'or' has symbol ',', and an example of usage as 'brand,sports,lessinfo'. Operator 'and' has symbol '+' and an example of usage as 'safari+touchphone+ios4x'.

Operators 800 are usable for group and user context definitions and on the attribute level. In some embodiments, the comparison operands (e.g., greater than, less than, greater than or equal to, less than or equal to, and not) where appropriate—for example, with regard to OS versions (e.g., where greater corresponds to a later version, where lesser corresponds to an earlier version) and with regard to screen width (e.g., where greater corresponds to a larger screen size, and lesser corresponds to a smaller screen size)—for example, <img tg-ios4.1_gt="hide"/>, which indicates an operating system version of iOS greater than 4.1; or, <img tg-width320_le="hide"/>, which indicates that a screen width is less than or equal to 320; but not, <img tg-safari_gt="hide"/>, because there is no such thing as greater than safari). In some embodiments, the operator 'not' is applicable to all categories (e.g., browser, os, format, dpi, screen, etc.)—for example, safari_not, android_not, ios3x_not, ios4.0_not, width320_not. In some embodiments, greater pixeldensity comprises a higher density and lesser pixeldensity comprises a lower density.

In some embodiments, a group or user context file containing the group or user context definition for a given site is maintained at $TOMCATHOME/webapps/ROOT/WEB-INF/core/rules/groups.xml, at $TOMCATHOME/webapps/ROOT/WEB-INF/core/rules/context.xml, or which is configurable via web.xml. A sample group file is as follows:

```
<GroupList>
  <Group name="mySafariIOS">
    <Category name="browser" value="safari"/>
    <Category name="os" value="ios"/>
  </Group>
  <Group name="myChromeAndroid">
    <Category name="browser" value="chrome"/>
    <Category name="os" value="android"/>
  </Group>
</GroupList>
```

In this example, two groups are defined: mySafariIOS which targets devices running iOS with safari browser, and myChromeAndroid which targets devices running android with chrome browser. In some embodiments, the file defines one or more user contexts.

In some embodiments, server-side page redirection is done using the "tg-redirect" meta tag—for example, <meta name="tg-redirect" content="iphone='URL1'; android='URL2'"/>. Note the usage of single and double quotes inside the content field. In various embodiments, the redirection URL specified is an absolute link (http:// or www.) or a relative link (/). For example, <meta name="tg-redirect" content="iphone='www.domain.com/iphone'; android='www.domain.com/android'"/>.

In some embodiments, the file containing the device detection updates by user-agent for a given site is maintained at $TOMCATHOME/webapps/ROOT/WEB-INF/core/rules/devicepatch.xml (configurable via web.xml). This file allows users to modify the characteristics of certain User Agents at a server level in order to provide enhanced flexibility within the framework. A sample patch file is as follows:

```
<DevicePatchList>
  <Device Useragent="ZTE-C88/1.0 SMIT-Browser/
    2.0.0" Screen="240"
  Format="jpg,jpeg,png,mp3"
  Feature="nocamera,noflash,nohtml5,notouch"
    Devicetype="phone"/>
</DevicePatchList>
```

In some embodiments, embedded instructions in a web asset are interpreted using a post-processor. The post-processor analyzes the web asset and determines if there are instructions to add to, to modify, or to remove elements of the web asset. In various embodiments, the web asset includes embedded instruction embedded in HTML, in CSS, in Javascript, or any other appropriate web asset instructions.

In some embodiments, an HTML embedded instruction includes the ability to overwrite an attribute or instruction, to show or hide instructions, to overwrite javascipt, or any other appropriate instruction. For example, rules to overwrite attributes or instructions are of the form: tg-groupname1,groupname2-attribute=value or tg-contextname1, contextname2-attribute=value. Note that it is customary for an HTML attribute that starts with 'tg-'. In some embodiments, a rule which overwrites a green background color to blue for safari browser or touch-enabled devices is as follows: <div style="background-color: green" tg-safari, touch-style="background-color: blue; margin:-2px"; />. Note that multiple groups or user contexts can be used separated by comma without any restrictions (e.g., groups can be custom groups, pre-defined groups, or a combination of custom and pre-defined groups, user contexts can be custom user contexts, pre-defined user contexts, or a combination of custom and pre-defined user contexts). For example, rules to overwrite attributes are of the form: tg-contextname1,contextname2=value, where the value is either 'hide' or 'show'. Note that it is customary for an HTML attribute that starts with 'tg-'. In some embodiments, a rule which overwrites a green background color to blue for safari browser or touch-enabled devices is as follows: <div style="background-color: green" tg-safari,touch-style="background-color: blue; margin:-2px"; In some embodiments, rules to show and hide JavaScript snippets within the code are of the form: <script tg-groupname1, groupname2,contextname1,contextnam2=value/>, where value can be 'hide' or 'show'. For example, the snippet below will only be displayed on iPhone devices (e.g., devicetype=phone AND os=iOS):

```
<script tg-ios,phone="show">
  alert("This is an iPhone!");
</script>
```

In some embodiments, a CSS embedded instruction includes the ability to overwrite an attribute or instruction, to restrict to certain groups, to manipulate tags, to hide or show tags, or any other appropriate instruction. For example, rules within the CSS code result in the CSS being selectively rendered according to the device requesting the page; CSS rules are similar to HTML rules and have a format of: tg-groupname1,groupname2-attribute:value. In the example below, the 'float: left' property will be overridden for devices from group g3.

```
#mydivId
{
  float: left;
  tg-g3-float:right;
}
```

In some embodiments, CSS rules are used to hide and show style tags. This is useful for limiting the CSS that is sent to a certain category of devices. For example, where the instructions below indicate that when the group is g1, then the instructions that font color is blue and font-size is 12px are hidden:

```
<style tg-g1="hide" type="text/css">
  #id1
  {
    color: blue;
    font-size: 12px;
  }
</style>
```

In some embodiments, tags are used to invoke available packaged modules, which offer compatibility across a range of devices and easy plug-in of complex features that otherwise might require multiple compatibility and rendering checks. Tags are invoked using the following syntax (e.g., starting with '<tg-'):

```
<tg-tagname attribute1="v1" attribute2="v2" . . . >
```

For example, a tag which adds appropriate click to call links on devices is as follows:

```
<tg-phonenumber>40877777</tg-phonenumber>
```

In another example, the image gallery tag adds a custom image gallery that degrades the user experience based on the device accessing the page:

```
<tg-imagegallery>
  <tg-option value="Url1">
  <tg-option value="Url2">
</tg-imagegallery>
```

FIG. 9 is a table illustrating an embodiment of a table of keywords. In the example shown, keywords 900 include '$', 'tg-', and '-' (hyphen as separator). Example 902 show example usages for keywords 900. For example, for 'tg-' examples include: '<img tg-iphone="hide"/> or '<tg-phonenumber>12345678</tg-phonenumber>'. For example, for '-' for a CSS attribute '-' is used as a separator:

```
Span{
  Float:left
  tg-g1-float:right
}
```

or as an element attribute:

```
<img src='url" tg-g1-src="url2">
```

Figure 10A:
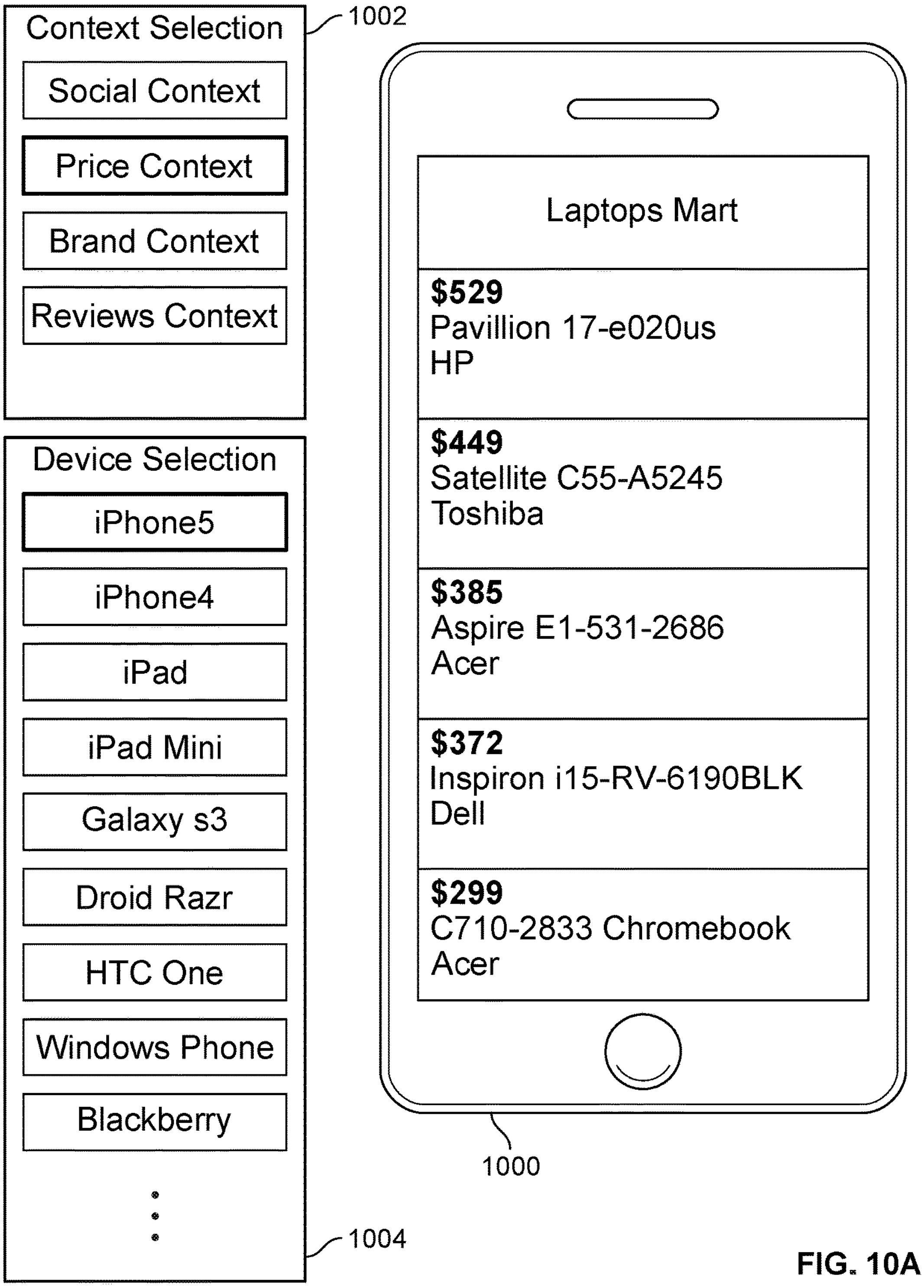
FIG. 10A is a diagram illustrating an embodiment of a web asset emulator.

FIG. 10A is a diagram illustrating an embodiment of a web asset emulator. In some embodiments, the web asset emulator of FIG. 10A emulates the display of a web asset. In some embodiments, the web asset emulator of FIG. 10A modifies a web asset based at least in part on one or more user contexts and on one or more groups. In the example shown, web asset display 1000 comprises a display emulating an iPhone 5™ being used by a user with a price-conscious user context. For example, web asset display 1000 shows entries for laptops mart including a first entry of $529 Pavillion 17-e020us HP, a second entry $449 Satellite C55-A5245 Toshiba, a third entry $385 Aspire E1-531-2686 Acer, a fourth entry $372 Inspiron i15-RV-6190BLK, and a fifth entry $299 C710-2833 Chromebook Acer. Context selector 1002 allows a web asset developer to select a user context to use for modifying the web asset. In the example shown, the available choices for context comprise social context, price-conscious context, brand-conscious context, and reviews context. Device selection 1004 allows a web asset developer to select a device to use while modifying the web asset. In various embodiments, a device selection comprises one of the following: iPhone5™, iPhone4™, iPad™, iPad™ mini, Galaxy S3, Droid Razr™, HTC One, a Windows™ phone, blackberry, or any other appropriate device. In some embodiments, selection of a device indicates selection of one or more groups (e.g., selection of iPhone5 comprises selection of ios operating system, mobile device, small touch display, etc.).

Figure 10B:
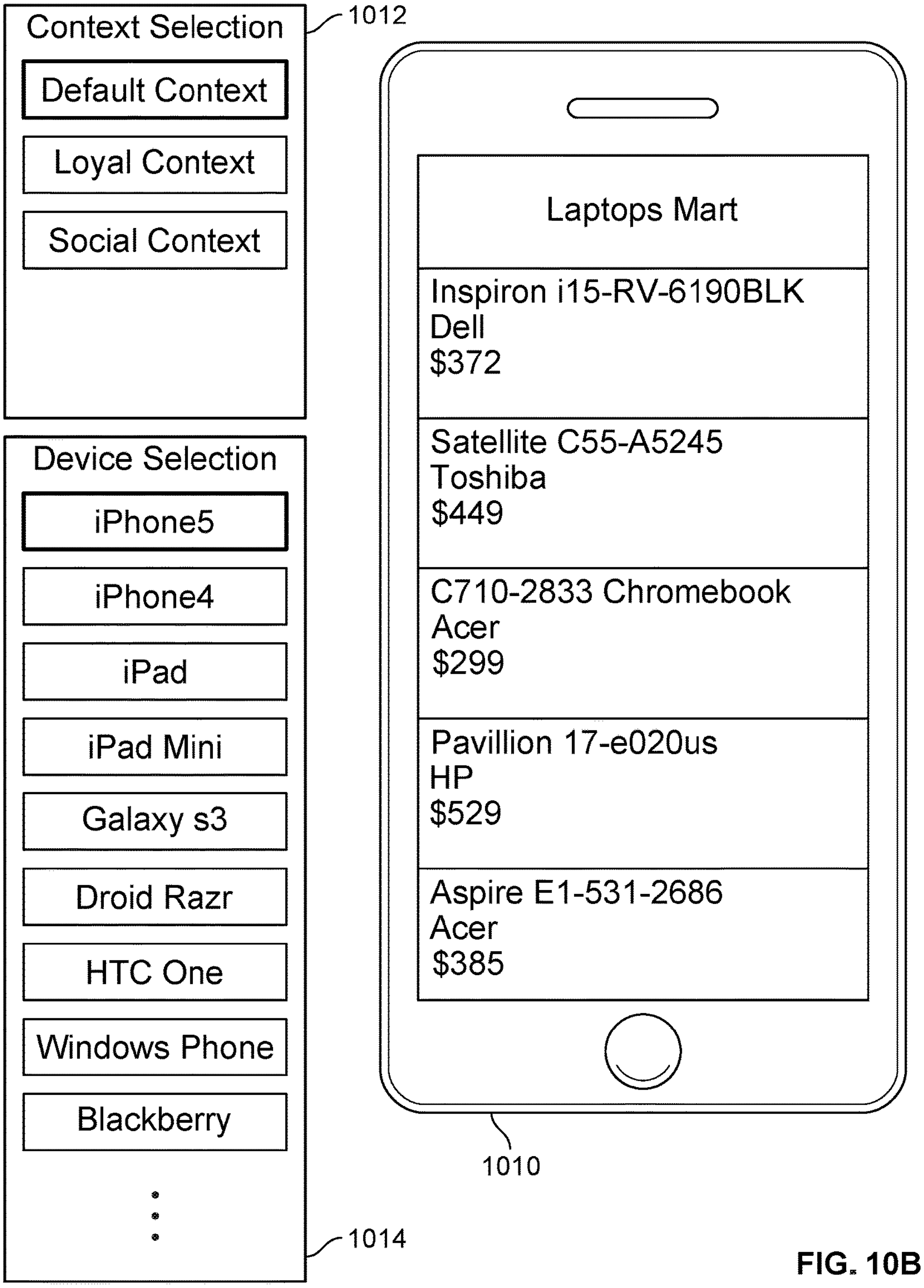
FIG. 10B is a diagram illustrating an embodiment of a web asset emulator.

FIG. 10B is a diagram illustrating an embodiment of a web asset emulator. In some embodiments, the web asset emulator of FIG. 10B emulates the display of a web asset. In some embodiments, the web asset emulator of FIG. 10B modifies a web asset based at least in part on one or more contexts and on one or more groups. In the example shown, web asset display 1010 comprises a display emulating an iPhone 5™ being used by a user with a default context. For example, web asset display 1010 shows entries for laptops mart including a first entry of $372 Inspiron i15-RV-6190BLK, a second entry $449 Satellite C55-A5245 Toshiba, a third entry $299 C710-2833 Chromebook Acer, a fourth entry $529 Pavillion 17-e020us HP, and a fifth entry $385 Aspire E1-531-2686 Acer. Context selector 1012 allows a web asset developer to select a context to use for modifying the web asset. In the example shown, the available choices for context comprise a default context, a loyal user context, and a social context. Device selection 1014 allows a web asset developer to select a device to use while modifying the web asset. In various embodiments, a device selection comprises one of the following: iPhone5™, iPhone4™, iPad™, iPad™ mini, Galaxy S3, Droid Razr™, HTC One, a Windows™ phone, blackberry, or any other appropriate device. In the example shown, the iPhone 5 device comprises a device with a 16:9 aspect ratio (e.g., the ratio of the screen height to the screen width comprises 16:9). In the example shown, the display shows a laptop sales website comprising a set of links to laptop computers for sale along with associated prices.

Figure 10C:
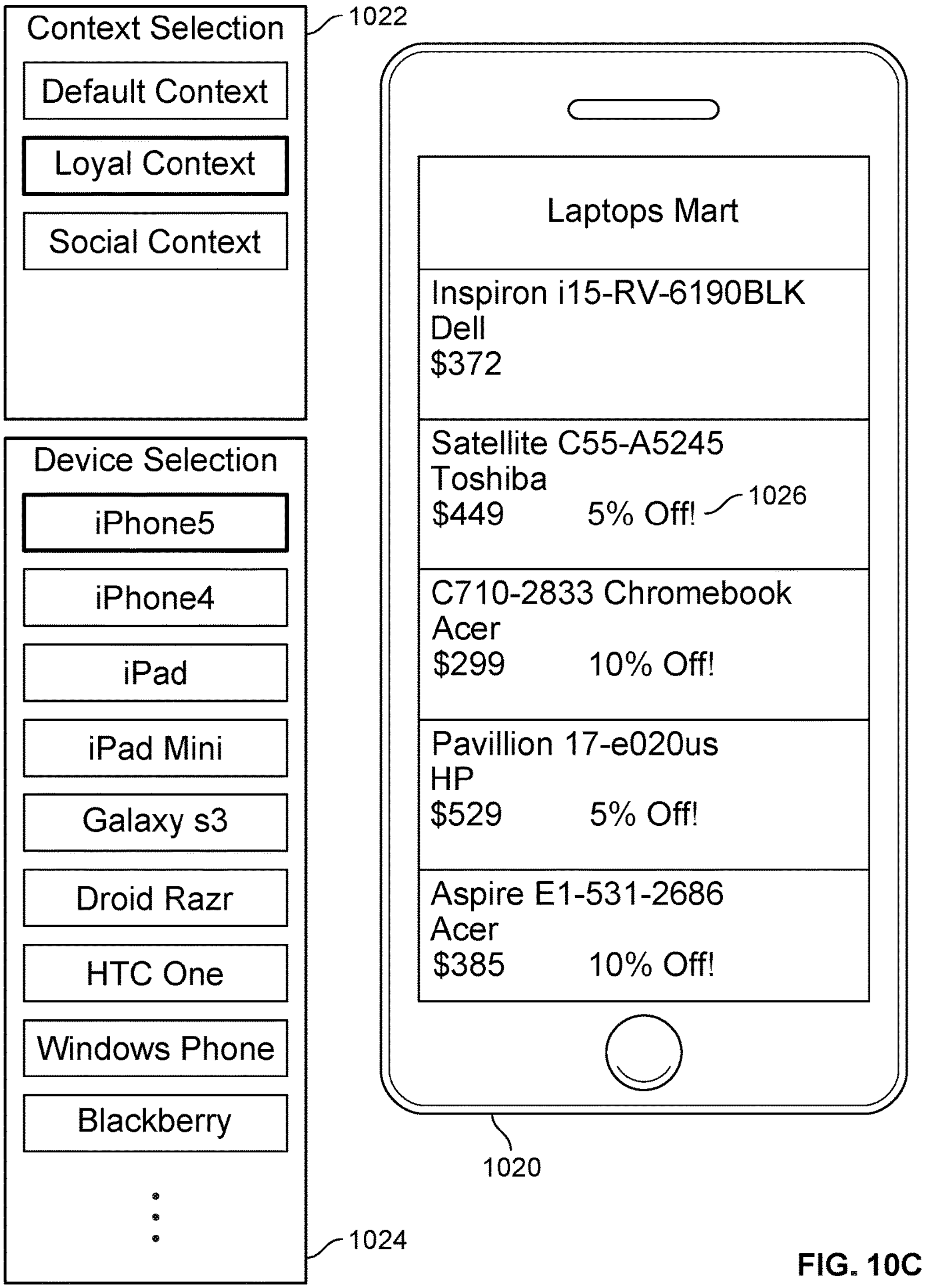
FIG. 10C is a diagram illustrating an embodiment of a web asset emulator.

FIG. 10C is a diagram illustrating an embodiment of a web asset emulator. In some embodiments, the web asset emulator of FIG. 10C emulates the display of a web asset. In some embodiments, the web asset emulator of FIG. 10C modifies a web asset based at least in part on one or more contexts and on one or more groups. In the example shown, web asset display 1020 comprises a display emulating an iPhone 5™ being used by a user with a loyal user context. Context selector 1022 allows a web asset developer to select a context to use for modifying the web asset. For example, web asset display 1020 shows entries for laptops mart including a first entry of $372 Inspiron i15-RV-6190BLK, a second entry $449 Satellite C55-A5245 Toshiba 5% off marker 1026, a third entry $299 C710-2833 Chromebook Acer 10% off, a fourth entry $529 Pavillion 17-e020us HP 5% off, and a fifth entry $385 Aspire E1-531-2686 Acer 10% off Device selection 1024 allows a web asset developer to select a device to use while modifying the web asset. In various embodiments, a device selection comprises one of the following: iPhone5™, iPhone4™, iPad™, iPad™ mini, Galaxy S3, Droid Razr™, HTC One, a Windows™ phone, blackberry, or any other appropriate device. In the example shown, the display shows a laptop sales website, customized for a loyal user context, comprising a set of links to laptop computers for sale along with associated prices. The laptop sales website additionally comprises a set of discount markers (e.g., discount marker 1026) indicating discounts available to a user. Discount markers are shown in a loyal user context.

Figure 10D:
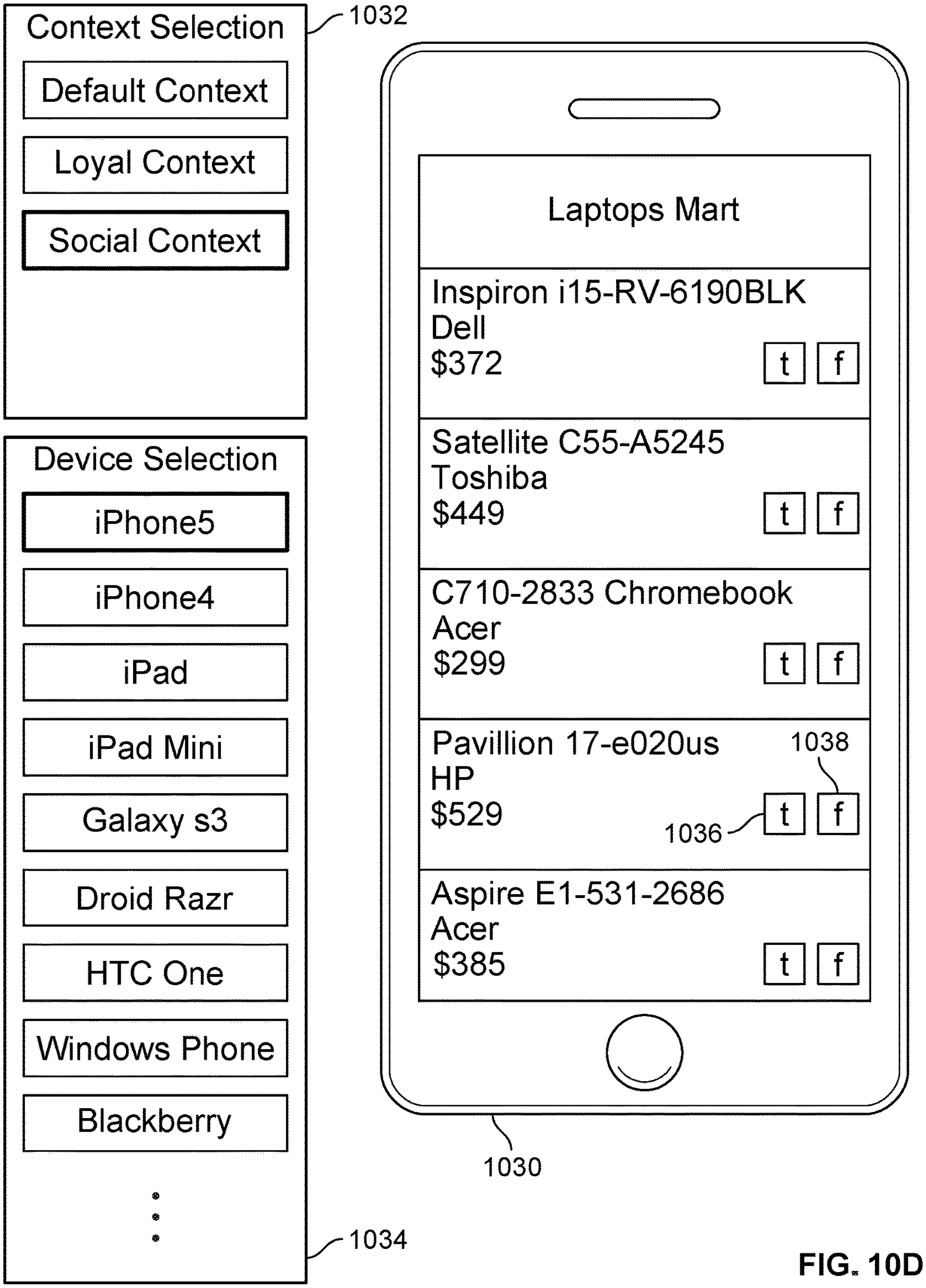
FIG. 10D is a diagram illustrating an embodiment of a web asset emulator.

FIG. 10D is a diagram illustrating an embodiment of a web asset emulator. In some embodiments, the web asset emulator of FIG. 10D emulates the display of a web asset. In some embodiments, the web asset emulator of FIG. 10D modifies a web asset based at least in part on one or more contexts and on one or more groups. In the example shown, web asset display 1030 comprises a display emulating an iPhone 5™ being used by a user with a social user context. For example, web asset display 1030 shows entries for laptops mart including a first entry of $372 Inspiron i15-RV-6190BLK, a second entry $449 Satellite C55-A5245 Toshiba off marker 1026, a third entry $299 C710-2833 Chromebook Acer, a fourth entry $529 Pavillion 17-e020us HP, and a fifth entry $385 Aspire E1-531-2686 Acer. Context selector 1032 allows a web asset developer to select a context to use for modifying the web asset. Device selection 1034 allows a web asset developer to select a device to use while modifying the web asset. In various embodiments, a device selection comprises one of the following: iPhone5™, iPhone4™, iPad™, iPad™ mini, Galaxy S3, Droid Razr™, HTC One, a Windows™ phone, blackberry, or any other appropriate device. In the example shown, the display shows a laptop sales website, customized for a social user context, comprising a set of links to laptop computers for sale along with associated prices. The laptop sales website additionally comprises a set of social links (e.g., social link 1036 't' and social link 1038 'f') facilitating a user posting a link to the computer for sale to a social media website. Social links are shown in a social user context.

Figure 10E:
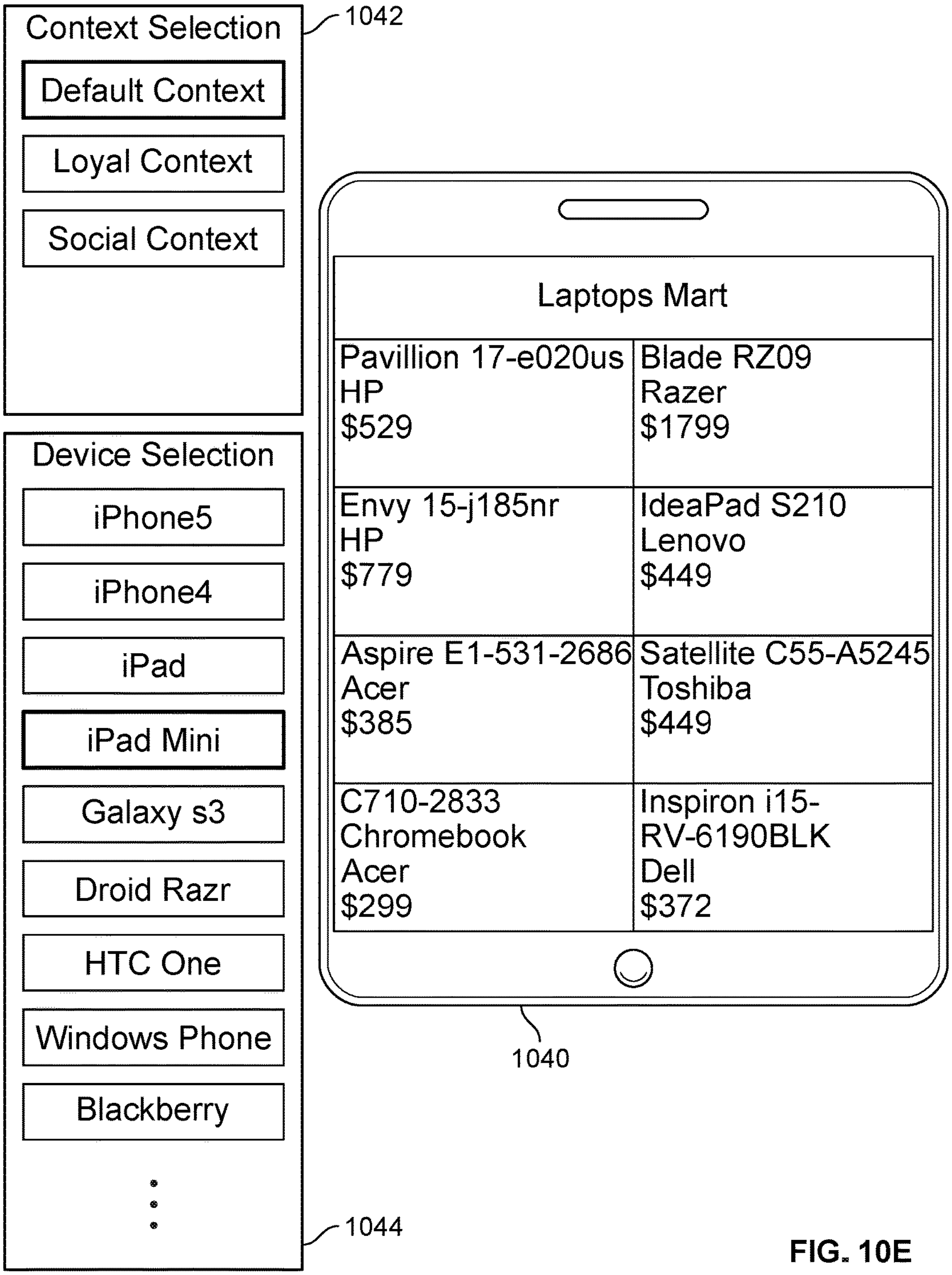
FIG. 10E is a diagram illustrating an embodiment of a web asset emulator.

FIG. 10E is a diagram illustrating an embodiment of a web asset emulator. In some embodiments, the web asset emulator of FIG. 10E emulates the display of a web asset. In some embodiments, the web asset emulator of FIG. 10E modifies a web asset based at least in part on one or more contexts and on one or more groups. In the example shown, web asset display 1040 comprises a display emulating an iPad Mini™ being used by a user with a default context. For example, web asset display 1040 shows entries for laptops mart include Pavillion 17-e020us HP $529, Blade RZ09 Razer $1799, Envy 15-j185nr HP $779, IdeaPad S210 lenovo $449, Aspire E1-531-2686 $385, Satellite C55-A5245 Toshiba $449, C710-2833 Chromebook Acer $299, and Inspiron i15-RV-6190BLK Dell $372. Context selector 1042 allows a web asset developer to select a context to use for modifying the web asset. In the example shown, the available choices for context comprise a default context, a loyal user context, and a social context. Device selection 1044 allows a web asset developer to select a device to use while modifying the web asset. In the example shown, the iPad Mini device comprises a device with a 4:3 aspect ratio (e.g., the ratio of the screen height to the screen width comprises 4:3). In the example shown, the display shows a laptop sales website comprising a set of links to laptop computers for sale along with associated prices. In the example shown, the wider screen (e.g., compared with an iPhone 5) allows information to be displayed in a wider format (e.g., in a two-column format as opposed to a one-column format). In various embodiments, a device selection comprises one of the following: iPhone5™, iPhone4™, iPad™, iPad™ mini, Galaxy S3, Droid Razr™, HTC One, a Windows™ phone, blackberry, or any other appropriate device.

Figure 10F:
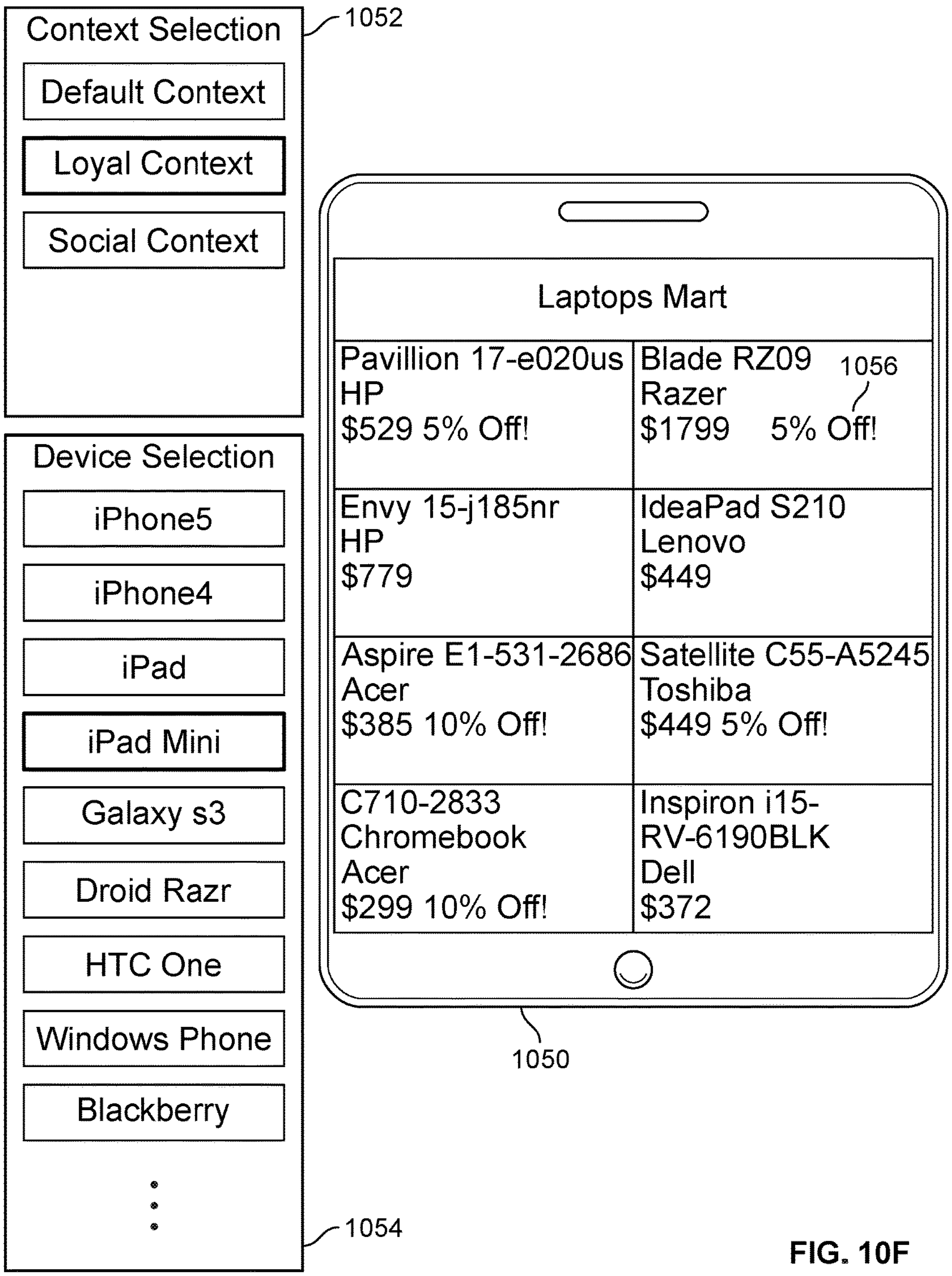
FIG. 10F is a diagram illustrating an embodiment of a web asset emulator.

FIG. 10F is a diagram illustrating an embodiment of a web asset emulator. In some embodiments, the web asset emulator of FIG. 10F emulates the display of a web asset. In some embodiments, the web asset emulator of FIG. 10F modifies a web asset based at least in part on one or more contexts and on one or more groups. In the example shown, web asset display 1050 comprises a display emulating an iPad Mini™ being used by a user with a loyal user context. For example, web asset display 1050 shows entries for laptops mart include Pavillion 17-e020us HP $529 5% Off!, Blade RZ09 Razer $1799 5% Off!, Envy 15-j185nr HP $779, IdeaPad S210 lenovo $449, Aspire E1-531-2686 $385 10% Off!, Satellite C55-A5245 Toshiba $449 5% Off!, C710-2833 Chromebook Acer $299 10% Off!, and Inspiron i15-RV-6190BLK Dell $372. Context selector 1052 allows a web asset developer to select a context to use for modifying the web asset. Device selection 1054 allows a web asset developer to select a device to use while modifying the web asset. In the example shown, the display shows a laptop sales website, customized for a loyal user context, comprising a set of links to laptop computers for sale along with associated prices. The laptop sales website additionally comprises a set of discount markers (e.g., discount marker 1056) indicating discounts available to a user. Discount markers are shown in a loyal user context. In various embodiments, a device selection comprises one of the following: iPhone5™, iPhone4™, iPad™, iPad™ mini, Galaxy S3, Droid Razr™, HTC One, a Windows™ phone, blackberry, or any other appropriate device.

Figure 10G:
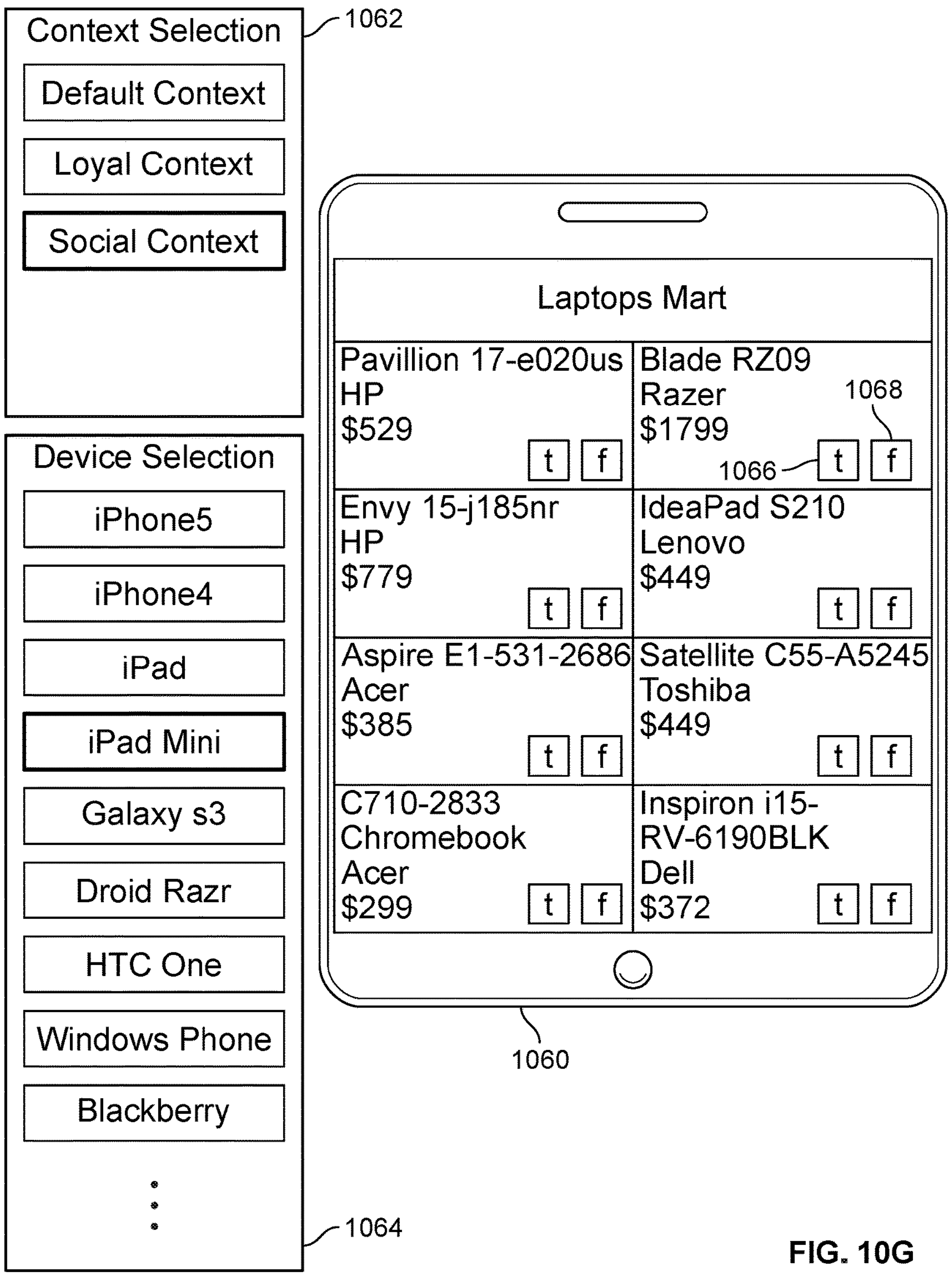
FIG. 10G is a diagram illustrating an embodiment of a web asset emulator.

FIG. 10G is a diagram illustrating an embodiment of a web asset emulator. In some embodiments, the web asset emulator of FIG. 10G emulates the display of a web asset. In some embodiments, the web asset emulator of FIG. 10G modifies a web asset based at least in part on one or more contexts and on one or more groups. In the example shown, web asset display 1060 comprises a display emulating an iPad Mini 5™ being used by a user with a social user context. For example, web asset display 1060 shows entries for laptops mart include Pavillion 17-e020us HP $529, Blade RZ09 Razer $1799, Envy 15-j185nr HP $779, IdeaPad S210 lenovo $449, Aspire E1-531-2686 $385, Satellite C55-A5245 Toshiba $449, C710-2833 Chromebook Acer $299, and Inspiron i15-RV-6190BLK Dell $372. Context selector 1062 allows a web asset developer to select a context to use for modifying the web asset. Device selection 1064 allows a web asset developer to select a device to use while modifying the web asset. In the example shown, the display shows a laptop sales website, customized for a social user context, comprising a set of links to laptop computers for sale along with associated prices. The laptop sales website additionally comprises a set of social links (e.g., social link 1066 and social link 1068) facilitating a user posting a link to the computer for sale to a social media website. Social links are shown in a social user context. In various embodiments, a device selection comprises one of the following: iPhone5™, iPhone4™, iPad™, iPad™ mini, Galaxy S3, Droid Razr™, HTC One, a Windows™ phone, blackberry, or any other appropriate device.

Figure 11:
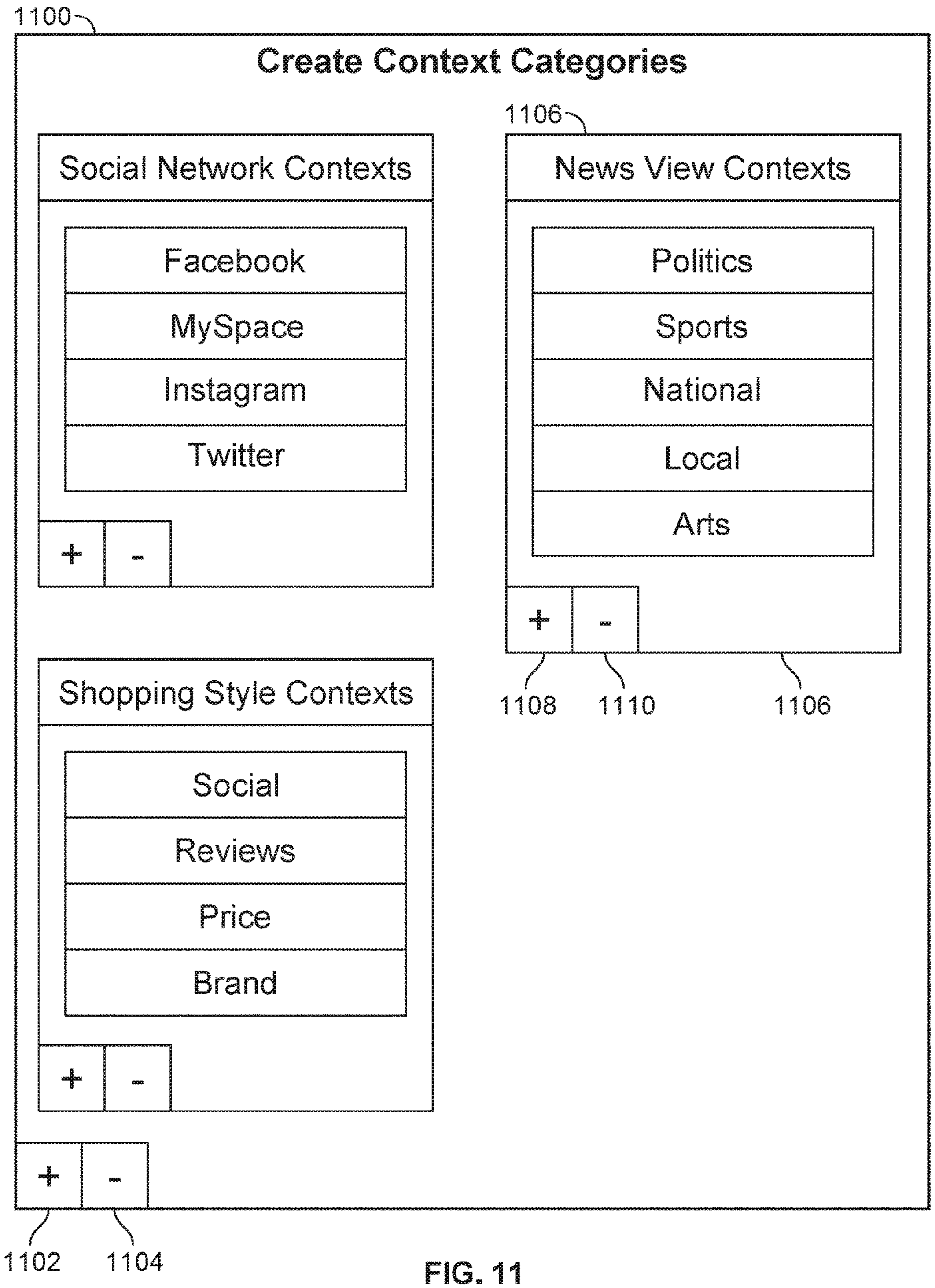
FIG. 11 is a diagram illustrating an embodiment of a user context category creator.

FIG. 11 is a diagram illustrating an embodiment of a user context category creator. In some embodiments, a web asset creator uses a user context category creator for creating user context categories and user contexts. In some embodiments, a web asset creator creates a custom user context category and associated set of user contexts tailored to a particular web asset. In the example shown, user context category creator 1100 comprises a user interface for creating a new user context category (e.g., via + button 1102) and deleting a user context category (e.g., via − button 1104). Each user context category (e.g., news view contexts 1106) comprises a user interface for creating a new user context (e.g., via + button 1108) and deleting a user context (e.g., via − button 1110). In the example shown, news view contexts 1106 comprises a set of user contexts describing a user's preference for news viewing (e.g., politics, sports, national, local, arts, etc.). For example, the user's view of the content is tailored for a user that has a preference or focus on a particular topic area (e.g., the politics user is shown news and events that impact focus). Social network contexts comprise a set of user contexts describing a user's preference for social networks (e.g., FACEBOOK™, MYSPACE™, INSTAGRAM™, TWITTER™, etc.). Shopping style contexts comprise a set of user contexts describing a user's preference for information while shopping (e.g., social network sourced information, reviews, price comparison information, brand information, price ranking, brand ranking, etc.). In some embodiments, sharing depth contexts comprise a set of user contexts indicating a user's preference for social network sharing of information (e.g., more, normal, or less sharing of personal information or viewing of other's information, etc.). In some embodiments, info depth user contexts comprise a set of contexts describing a user's preference for the amount of information provided (e.g., more, normal, or less information that is shown to the user regarding an item).

Figure 12:
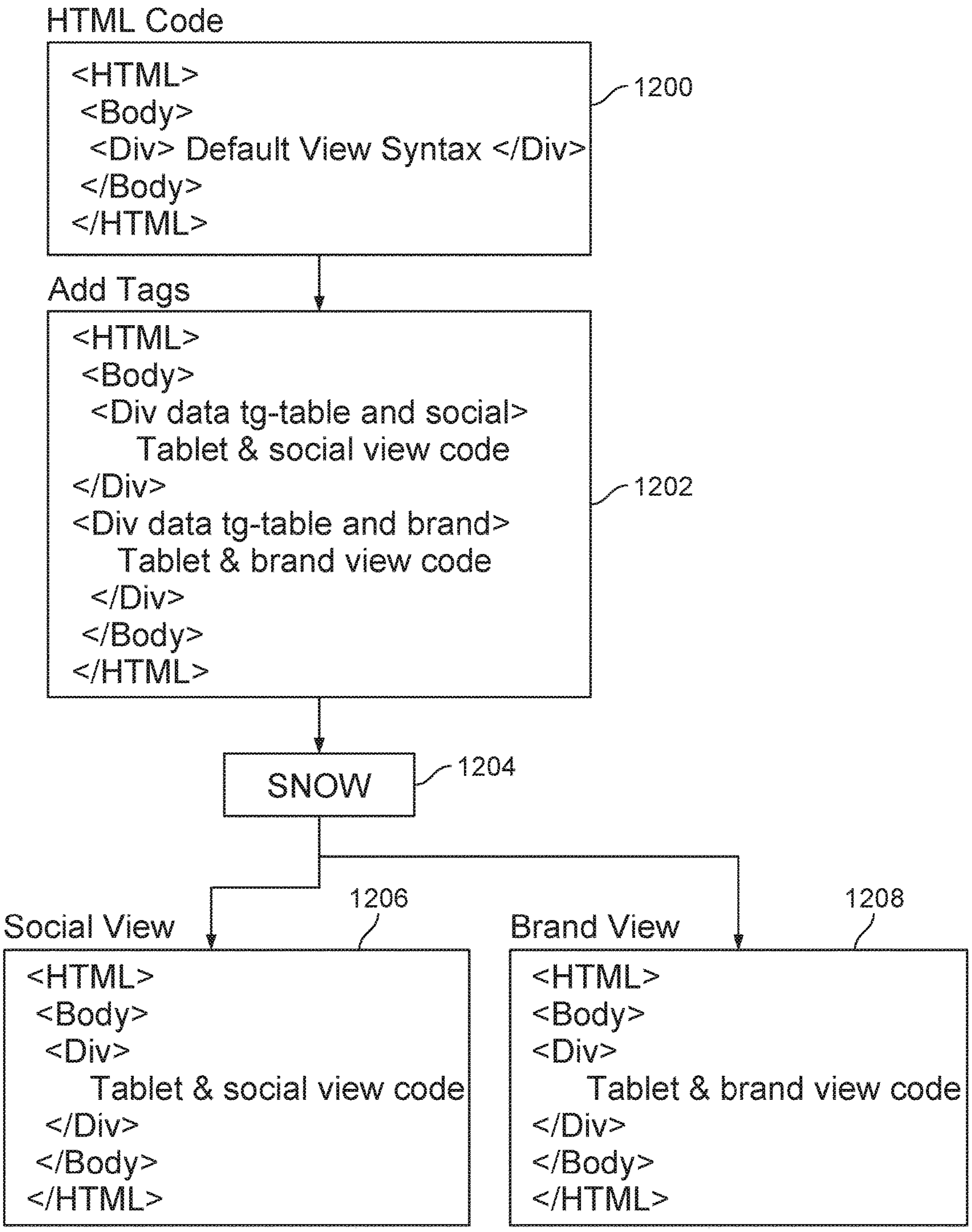
FIG. 12 is a diagram illustrating an embodiment of a HTML processing flow.

FIG. 12 is a diagram illustrating an embodiment of a HTML processing flow. In some embodiments, the diagram of FIG. 12 shows web assets modified based on a user context. In the example shown, HTML code 1200 comprises a default view HTML code for a website. The default view HTML code is modified to include tags for groups and user contexts in 1202 (e.g., tablet and social view, tablet and brand view, etc.). The modified code is processed by SNOW (e.g., software enabling one web) system 1204. SNOW system 1204 determines a group and a user context and processes the tagged code. SNOW system 1204 produces HTML code appropriate to the determined combination of group and user context. In the example shown, SNOW system 1204 produces social view code 1206 for devices determined to be tablets using a social view and brand view code 1208 for devices determined to be tables using brand view.

Figure 13:
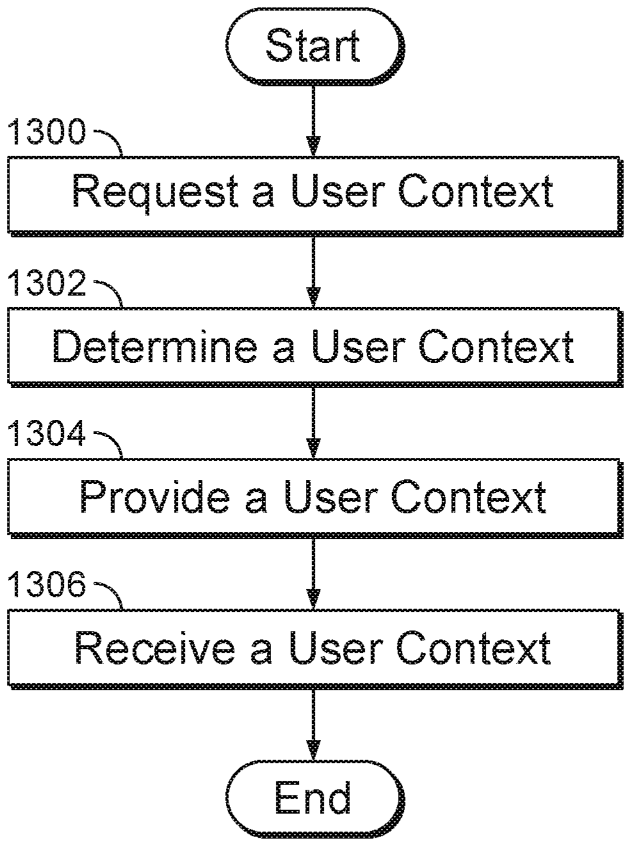
FIG. 13 is a flow diagram illustrating an embodiment of a process for accessing a user context.

FIG. 13 is a flow diagram illustrating an embodiment of a process for accessing a user context. In some embodiments, the process of FIG. 13 is performed by SNOW system 1204 of FIG. 12. In the example shown, in 1300, a user context is requested. In some embodiments, a user context is requested from a user context server. In some embodiments, requesting a user context comprises providing user associated information (e.g., a user identifier, a browser identifier, etc.) In 1302, a user context is determined. In some embodiments, the user context is determined by a user context server. In some embodiments, the user context server is comprised by the SNOW system. In some embodiments, a user context is determined by accessing a user context database and determining the user context associated with a user. In 1304, a user context is provided. In 1306, a user context is received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for web asset modification, comprising:
a processor configured to:
receive a request for a web asset for display on a device;
receive an indication of one or more user contexts, wherein a user context of the one or more user contexts comprises one of the following: a user behavior, a user location, a user category, a user access channel, a user social network, a user shopping style, or a user info depth;
determine one or more groups, wherein each of the one or more groups comprises a group for adapting display of the web asset on the device, wherein the group comprises one of the following: a phone group, a tablet group, a smart TV group, a browser group, an IOS group, or a 7 inch screen group;
locate customization instructions embedded in the web asset, wherein locating customization instructions comprises analyzing syntax of the web asset;
modify the web asset using the customization instructions embedded in the web asset to generate a modified web asset, wherein modifying the web asset is based at least in part on one user context of the one or more user contexts and one group of the one or more groups to obtain the modified web asset, and wherein the one user context, the one group, or a combination thereof is operated on by an operator, the operator including greater than, less than, greater than or equal to, less than or equal to, not, or any combination thereof, wherein the modifying of the web asset comprises to add a first web asset element or hide a second web asset element, the web asset being associated with the first web asset element and the second web asset element, wherein the modifying of the web asset comprises to:
determine whether the web asset is operated in a first user context or a second user context, the first user context being different from the second user context; and
obtain a first modified web asset or a second modified web asset depending on whether the user context is associated with the first user context or the second user context, respectively, the first modified web asset being different from the second modified web asset, wherein:
in response to a determination that the web asset is operated in the first user context and associated with a first group, the first modified web asset adds the first web asset element; and
in response to a determination that the web asset is operated in the second user context and associated with a second group, the second modified web asset hides the second web asset element;
store the modified web asset; and
provide the modified web asset for display on the device; and
a memory coupled to the processor and configured to provide the processor with instructions.

2. A system as in claim 1, wherein the device comprise an electronic gadget with a web browser connected to the internet.

3. A system as in claim 1, wherein the web asset comprises a web page.

4. A system as in claim 1, wherein the web asset comprises one or more of the following: HTML instructions, CSS instructions, or JavaScript instructions.

5. A system as in claim 1, wherein the user behavior comprises one of the following: a politics interest, a sports interest, a price interest, or a brand interest.

6. A system as in claim 1, wherein the user location comprises one or more of: a latitude, a longitude, a zip code, a city, a metropolitan area, a state, a country, or a continent.

7. A system as in claim 1, wherein the user category comprises one of the following: a premium user, a female user, a senior user, or an A/B testing user.

8. A system as in claim 1, wherein the user access channel comprises one of the following: a low speed network, a 3G network, or a Wi-Fi network.

9. A system as in claim 1, wherein the user shopping style comprises one of the following: social, review, price, or brand.

10. A system as in claim 1, wherein the user info depth comprises one of the following: moreinfo, normalinfo, or lessinfo.

11. A system as in claim 1, wherein the web asset is modified based on the one or more groups or the one or more user contexts and an overwriting instruction provided in the web asset.

12. A system as in claim 11, wherein the overwriting instruction includes overwriting a HTML attribute or a CSS attribute.

13. A system as in claim 11, wherein the overwriting instruction includes showing or hiding one or more instructions based at least in part on the one or more groups or the one or more user contexts.

14. A system as in claim 11, wherein the overwriting instruction includes picking a web asset based at least in part on the one or more groups or the one or more user contexts.

15. A system as in claim 11, wherein the overwriting instruction preserves web asset functionality.

16. A system as in claim 1, wherein the web asset is received from a backend processor.

17. A system as in claim 1, wherein the processor comprises one of the following: a proxy server processor, a web server processor, or an edge router processor.

18. A system as in claim 1, wherein the processor is further configured to select a specific web asset for display from a set of web assets based at least in part on the request for the web asset, the one or more user contexts, and the one or more groups.

19. A method of web asset modification, comprising:

receiving a request for a web asset for display on a device;

receiving an indication of one or more user contexts, wherein a user context of the one or more user contexts comprises one of the following: a user behavior, a user location, a user category, a user access channel, a user social network, a user shopping style, or a user info depth;

determining one or more groups, wherein each of the one or more groups comprises a group for adapting display of the web asset on the device, wherein the group comprises one of the following: a phone group, a tablet group, a smart TV group, a browser group, an IOS group, or a 7 inch screen group;

locating customization instructions embedded in the web asset, wherein locating customization instructions comprises analyzing syntax of the web asset;

modifying, using a processor, the web asset using the customization instructions embedded in the web asset to generate a modified web asset, wherein modifying the web asset is based at least in part on one user context of the one or more user contexts and one group of the one or more groups, and wherein the one user context, the one group, or a combination thereof is operated on by an operator, the operator including greater than, less than, greater than or equal to, less than or equal to, not, or any combination thereof, wherein the modifying of the web asset comprises adding a first web asset element or hiding a second web asset element, the web asset being associated with the first web asset element and the second web asset element, wherein the modifying of the web asset comprises:

determining whether the web asset is operated in a first user context or a second user context, the first user context being different from the second user context; and obtaining a first modified web asset or a second modified web asset depending on whether the user context is associated with the first user context or the second user context, respectively, the first modified web asset being different from the second modified web asset, wherein:

in response to a determination that the web asset is operated in the first user context and associated with a first group, the first modified web asset adds the first web asset element; and in response to a determination that the web asset is operated in the second user context and associated with a second group, the second modified web asset hides the second web asset element;

storing the modified web asset; and providing the modified web asset for display on the device.

20. A computer program product for web asset modification, the computer program product being embodied in a non-transitory computer readable storage medium and comprising computer instructions for:

receiving a request for a web asset for display on a device;

receiving an indication of one or more user contexts, wherein a user context of the one or more user contexts comprises one of the following: a user behavior, a user location, a user category, a user access channel, a user social network, a user shopping style, or a user info depth;

determining one or more groups, wherein each of the one or more groups comprises a group for adapting display of the web asset on the device, wherein the group comprises one of the following: a phone group, a tablet group, a smart TV group, a browser group, an IOS group, or a 7 inch screen group;

locating customization instructions embedded in a web asset, wherein locating customization instructions comprises analyzing syntax of the web asset;

modifying the web asset using the customization instructions embedded in the web asset to generate a modified web asset, wherein modifying the web asset is based at least in part on one user context of the one or more user contexts and one group of the one or more groups, and wherein the one user context, the one group, or a combination thereof is operated on by an operator, the operator including greater than, less than, greater than or equal to, less than or equal to, not, or any combination thereof, wherein the modifying of the web asset comprises adding a first web asset element or hiding a second web asset element, the web asset being associated with the first web asset element and the second web asset element, wherein the modifying of the web asset comprises:

determining whether the web asset is operated in a first user context or a second user context, the first user context being different from the second user context; and obtaining a first modified web asset or a second modified web asset depending on whether the user context is associated with the first user context or the second user context, respectively, the first modified web asset being different from the second modified web asset, wherein:

in response to a determination that the web asset is operated in the first user context and associated with a first group, the first modified web asset adds the first web asset element; and in response to a determination that the web asset is operated in the second user context and associated with a second group, the second modified web asset hides the second web asset element;

storing the modified web asset; and providing the modified web asset for display on the device.

* * * * *